US012664796B2

(12) United States Patent  (10) Patent No.: US 12,664,796 B2
Hempel et al.  (45) Date of Patent: Jun. 23, 2026

(54) GAZE DATA GENERATION FOR IN-CABIN MONITORING SYSTEMS AND APPLICATIONS

(71) Applicant: NVIDIA Corporation, Santa Clara, CA (US)

(72) Inventors: Martin Hempel, Mountain View, CA (US); Nishant Puri, San Francisco, CA (US); Anshul Jain, San Jose, CA (US); Chun-Wei Chen, San Jose, CA (US); Dae Jin Kim, San Jose, CA (US); Frederic Vatnsdal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 578 days.

(21) Appl. No.: 18/176,327

(22) Filed: Feb. 28, 2023

(65) Prior Publication Data

US 2024/0290112 A1   Aug. 29, 2024

(51) Int. Cl.
    *G06V 20/59*   (2022.01)
    *B60W 40/08*   (2012.01)
    *G06F 3/01*   (2006.01)
(52) U.S. Cl.
    CPC ........... *G06V 20/597* (2022.01); *B60W 40/08* (2013.01); *G06F 3/013* (2013.01)
(58) Field of Classification Search
    CPC ....... G06V 20/597; B60W 40/08; G06F 3/013
    USPC ........................................................ 382/103
    See application file for complete search history.

(56) References Cited

U.S. PATENT DOCUMENTS

| | | | |
|---|---|---|---|
| 10,885,698 B2 | 1/2021 | Muthler et al. | |
| 2022/0019086 A1* | 1/2022 | Yao | G02B 27/0172 |
| 2023/0264702 A1* | 8/2023 | Chang | G01S 13/86 |
| | | | 702/150 |

(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Gabriel I Garcia
(74) *Attorney, Agent, or Firm* — Shook, Hardy & Bacon L.L.P.

(57)        ABSTRACT

In various examples, systems and method are provided for generation of ground truth gaze data for training in-cabin monitoring systems and applications. A gaze target projector mounted to a known position inside a cabin may be used to project a gaze target onto an interior surface of the cabin. Because a beam of light may be used to produce the projected gaze target, the projected gaze target may be displayed at a projection point on the surface of the cabin interior, even if the surface at the projection point is curved, small, or an irregular shape. Three-dimensional coordinates of a projected gaze target in the cabin coordinate system may be determined and used to label image data that is captured as a projected gaze target is selectively projected onto an interior surface of the cabin and a test occupant's gaze is directed at the projected gaze target.

20 Claims, 17 Drawing Sheets

(56) References Cited

U.S. PATENT DOCUMENTS

2024/0104879 A1*   3/2024   Jiang ................... G06V 10/245
2024/0161527 A1*   5/2024   Jotwani ................... G06T 7/70

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicles—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

U.S. Appl. No. 17/935,473, titled "Multi-Modal Sensor Calibration for In-Cabin Monitoring Systems and Applications" filed, Sep. 26, 2022.

U.S. Appl. No. 17/935,465, titled "Sensor Calibration Using Fiducial Markers for In-Cabin Monitoring Systems and Applications" filed Sep. 26, 2022.

* cited by examiner

900

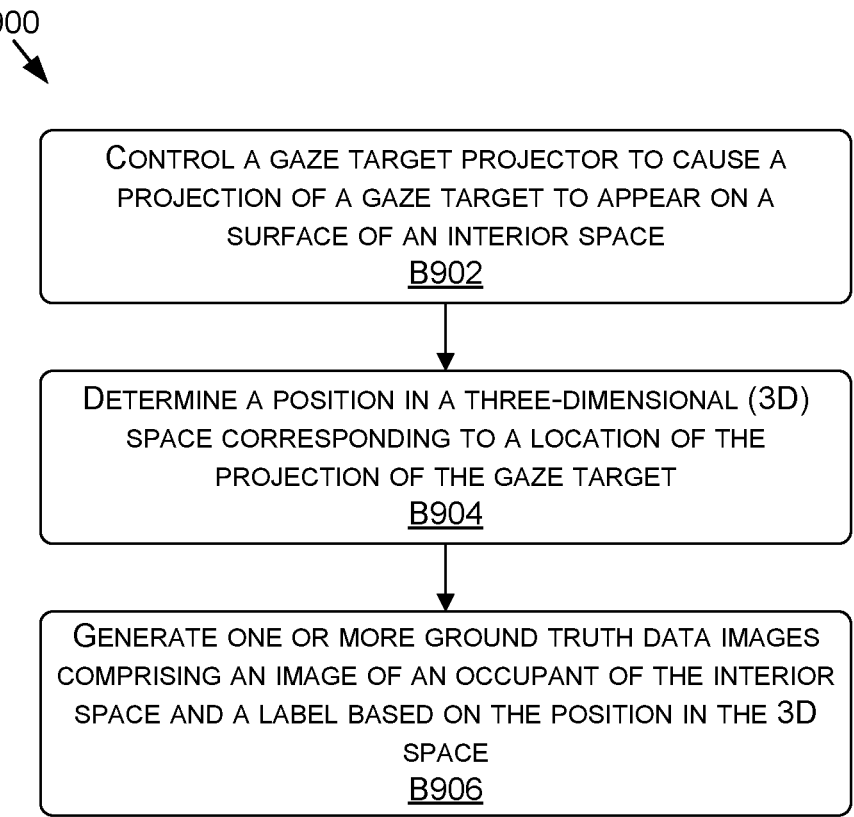

CONTROL A GAZE TARGET PROJECTOR TO CAUSE A
PROJECTION OF A GAZE TARGET TO APPEAR ON A
SURFACE OF AN INTERIOR SPACE
B902

DETERMINE A POSITION IN A THREE-DIMENSIONAL (3D)
SPACE CORRESPONDING TO A LOCATION OF THE
PROJECTION OF THE GAZE TARGET
B904

GENERATE ONE OR MORE GROUND TRUTH DATA IMAGES
COMPRISING AN IMAGE OF AN OCCUPANT OF THE INTERIOR
SPACE AND A LABEL BASED ON THE POSITION IN THE 3D
SPACE
B906

FIGURE 9

STEREO CAMERA 1268

MID-RANGE CAMERA, WING MIRROR MOUNT 1298

SURROUND CAMERA 1274

SURROUND CAMERA(S) 1274

MID-RANGE CAMERA, WING MIRROR MOUNT 1298

SURROUND CAMERA(S) 1274

1200

INFRARED CAMERA 1272

WIDE VIEW CAMERA 1270

LONG-RANGE CAMERA 1298

LONG-RANGE CAMERA 1298

STEREO CAMERA 1268

1276

SERVER(S) 1278

CPU 1280(B)

CPU 1280(A)

PCIE SWITCH 1282(D)

PCIE SWITCH 1282(C)

PCIE SWITCH 1282(B)

PCIE SWITCH 1282(A)

1286

GPU 1284(F)

GPU 1284(H)

GPU 1284(E)

GPU 1284(G)

GPU 1284(B)

GPU 1284(D)

GPU 1284(A)

GPU 1284(C)

1288

1200

1294

1292

NETWORK(S) 1290

1300

MEMORY
1304

I/O COMPONENTS
1314

CPU(S)
1306

POWER SUPPLY
1316

GPU(S)
1308

PRESENTATION
COMPONENT(S)
1318

COMM. INTERFACE
1310

LOGIC UNIT(S)
1320

I/O PORT(S)
1312

1302

1400

GAZE DATA GENERATION FOR IN-CABIN MONITORING SYSTEMS AND APPLICATIONS

BACKGROUND

Autonomous and semi-autonomous vehicles rely on machine learning approaches—such as those using deep neural networks (DNNs)—to analyze images of an interior space (e.g., cabin, cockpit) of a vehicle or other machine. An Occupant Monitoring System (OMS) is an example of a system that may be used within a vehicle cabin to perform real-time assessments of occupant or operator presence, gaze, alertness, and/or other conditions. For example, OMS sensors (such as, but not limited to, RGB sensors, infrared (IR) sensors, depth sensor, cameras, and/or other optical sensors) may be used to track an occupant's or operator's gaze direction, head pose, and/or blinking. This gaze information may be used to determine a level of attentiveness of the occupant or operator (e.g., to detect drowsiness, fatigue, and/or distraction), and/or to take responsive action to prevent harm to the occupant or operator—e.g., by redirecting their attention to a potential hazard, pulling the vehicle over, and/or the like. For example, DNNs may be used to detect that an operator is falling asleep at the wheel, based on the operator's downward gaze toward the floor of the vehicle, and the detection may lead to an adjustment in the speed and direction of the car (e.g., pulling the vehicle over to the side of the road) or an auditory alert to the operator. Occupant monitoring systems often rely on training DNNs with a high volume of training image data that reflects the facial features of different persons to help increase the accuracy of gaze predictions across all persons.

SUMMARY

Embodiments of the present disclosure relate to techniques for generating ground truth gaze data for training in-cabin monitoring systems and applications. During the collection of the gaze training data it may be challenging to collect gaze data corresponding to surfaces that are curved, small, or an irregular shape. As a result of this challenge, gaze data may not be collected—or may not be collected accurately—from certain locations within the cabin of a vehicle. As a result, the robustness of the training data for training a DNN may be limited to the gaze target locations that are easier to implement.

In contrast to conventional systems, such as those described above, the systems and methods presented in this disclosure may use a gaze target projector mounted at a known position inside a cabin to produce (e.g., cause a projection of) a projected gaze target onto an interior surface of the cabin. In some embodiments, the gaze target projector may include a robotic gaze target projector (e.g., such as a gimbal mounted robotic laser and/or laser range finder). In some embodiments, the gaze target projector may include a heads-up display projector. Because a beam of light may be used to produce the projected gaze target, the projected gaze target may be displayed at a projection point on the surface of the cabin interior, even if the surface at the projection point is curved, small, or an irregular shape, as long as there is an unobstructed line of sight between the gaze target projector and the desired projection point. Moreover, the gaze target projector may include a range finding sensor (e.g., a laser range finder, an ultrasonic range finder) to determine a distance from the gaze target projector to the target point where the projected gaze target appears. A representation of the projection point location of the projected gaze target (e.g., in polar coordinates azimuth, elevation, and distance), may be transformed to Cartesian coordinates with respect to the gaze target projector, which in turn may be mapped to the cabin coordinate system. As such, when the gaze target projector is controlled to produce a projected gaze target at a projection point on an interior surface of the cabin, the 3D coordinates of that projected gaze target in the cabin coordinate system may be readily ascertained.

Ground truth gaze data may be generated using a gaze target projector by capturing image data that include, for example, image frames of a test occupant's eyes and gaze direction. The image data is captured as the projected gaze targets are selectively projected onto an interior surface of the cabin and the test driver's gaze is directed at the projected gaze target. The projection of the gaze target should catch the test driver's attention as image frames capture the test occupant's eyes as their gaze is directed at the illumination of the projected gaze target. The captured image frames may be labeled (e.g., tagged) with the 3D coordinates of the projected gaze target to produce ground truth data corresponding to the training image. Additional ground truth gaze data may be generated in the same manner to produce a set of training data by sequentially generating additional projected gaze targets onto various interior surfaces of the cabin while image frames capture the driver's (or other occupant's) eyes and gaze direction.

BRIEF DESCRIPTION OF THE DRAWINGS

The present systems and methods for generation of ground truth gaze data for training in-cabin monitoring systems and applications are described in detail below with reference to the attached drawing figures, wherein:

FIG. 9 is a flow diagram showing a method for generating ground truth gaze data, in accordance with some embodiments of the present disclosure;

DETAILED DESCRIPTION

Figure 1:
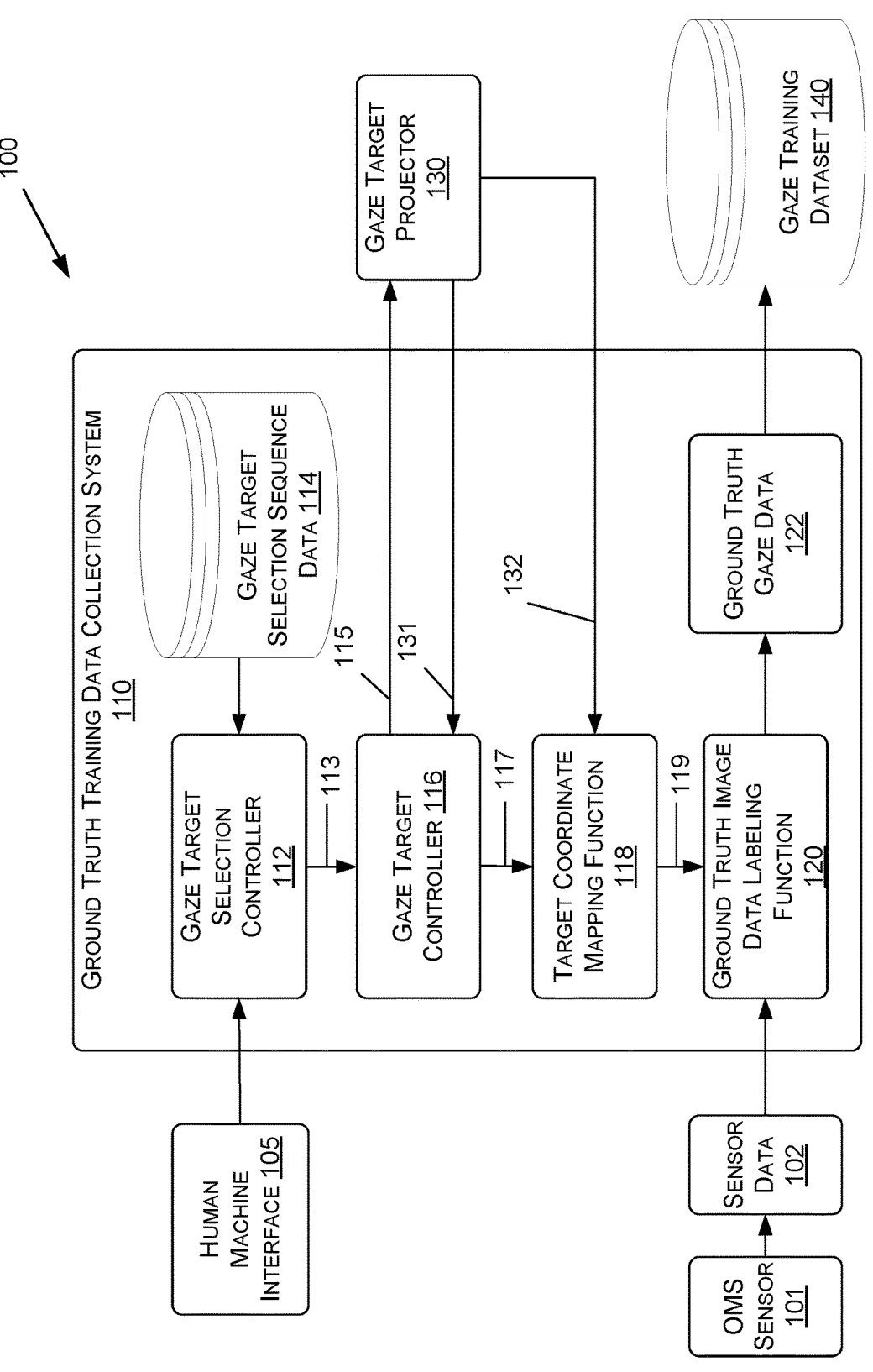
FIG. 1 is an illustration of an example flow diagram for an ground truth gaze training data collection operating environment, in accordance with some embodiments of the present disclosure.

Systems and methods are disclosed related to techniques for generating ground truth gaze data for training in-cabin monitoring systems and applications. Although the present disclosure may be described with respect to generation of ground truth gaze data for training in-cabin monitoring systems of an example autonomous vehicle 1200 (alternatively referred to herein as "vehicle 1200" or "ego-vehicle 1200," an example of which is described with respect to FIGS. 12A-12D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to generation of ground truth gaze data for training in-cabin monitoring systems and applications, this is not intended to be limiting, and the systems and methods described herein may be used in augmented reality, virtual reality, mixed reality, robotics, security and surveillance, autonomous or semi-autonomous machine applications, and/or any other technology spaces where ground truth gaze data may be used.

The present disclosure relates to vehicle occupant monitoring technologies. More specifically, the systems and methods presented in this disclosure provide for generating ground truth gaze data for training an occupant monitoring system (OMS) to determine an occupant gaze direction from an image frame representing the occupant, for example, to provide driver and occupant assessment functions (e.g., driver and occupant presence, gaze, alertness, and/or other conditions). An OMS may comprise a driver monitoring system (DMS), a system that monitors non-driver occupants, or a system that monitors driver occupant(s) and/or non-driver occupant(s).

Light emitting diode (LED) panels are an example of one type of existing ground truth data collection technology that may be used to collect training image data to train a DNN for an OMS. The LED panel may include an array of LEDs that may be selectively illuminated to capture the attention of a test occupant, and cause the test occupant to gaze at the illuminated LEDs. Ground truth gaze data may be generated by capturing (e.g., with a calibrated OMS sensor) images of a test occupant's eyes and gaze direction as LED gaze targets are selectively activated. For example, a test operator may illuminate a first gaze target while a calibrated OMS sensor captures images of a test occupant seated in the cabin. The illumination of the first gaze target may catch the test occupant's attention as image frames capture images of the test occupant's eyes as their gaze is directed at the illumination of the gaze target.

However, during the collection of the training data using tools such as LED panels, it may be challenging to arrange and activate target points for a subject to look at—especially where the surface where the tool is placed is curved, small, or an irregular shape. As a result of this challenge, gaze data may not be collected—or may not be collected accurately—from certain locations (e.g., within the cabin of a vehicle). As a result, the robustness of the training data for training a DNN may be limited to the gaze target locations that are easier to implement. The training data may thus include an absence of training data for other gaze target locations that may be common, useful, and/or necessary for accurate gaze detection, but that are challenging to generate accurate or precise data for. Moreover, many LED panels may be needed to capture ground truth gaze data covering the full area of the cabin interior that is within an occupant's field of view.

In contrast to existing gaze data collection technologies, the systems and methods presented in this disclosure may use a gaze target projector mounted to a known position inside a cabin to cause a projection of a gaze target to appear on an interior surface of the cabin. In some embodiments, the gaze target projector may include a robotic gaze target projector (e.g., such as a gimbal mounted robotic laser and/or laser range finder). In some embodiments, the gaze target projector may include a heads-up display projector. A base of the gaze target projector may include one or more fiducial point markers (e.g., AprilTag patterns, ARtag patterns, and/or other patterns) that localize and facilitate determining a 3D position and orientation of the base of the gaze target projector with respect to a 3D in-cabin coordinate system (which may be referred to herein as the cabin coordinate system). By capturing an image frame of the gaze target projector, 2D coordinates of the fiducial point marker(s) may be determined with respect to the image frame, and a pose and 3D coordinates of the gaze target projector may be computed with respect to the cabin coordinate system.

In some embodiments, the gaze target projector may include one or more motors and/or incremental encoders, coupled to a controller. The controller may control a motor to rotate a laser (or other visual projection emitter) to point in the direction of a specified polar coordinate (e.g., azimuth and elevation) with respect to an origin defined by the base of the gaze target projector. The controller may activate the laser to produce a projected gaze target on an interior surface of the cabin at which the laser is pointed. Because a beam of light may be used to produce the projected gaze target, the projected gaze target may be produced at a projection point on the surface of the cabin interior, even if the surface at the projection point is curved, small, or an irregular shape, as long as there is an unobstructed line of sight between the gaze target projector and the desired projection point. Moreover, the gaze target projector may include a range finding sensor (e.g., a laser range finder, an ultrasonic range finder) to determine a distance from the gaze target projector to the target point where the projected gaze target appears. A representation of the projection point location of the projected gaze target (e.g., in polar coordinates azimuth, elevation, and distance), for example as measured in the coordinate system of the gaze target projector, may be transformed to (e.g., Cartesian coordinates) a coordinate system of the gaze target projector, which in turn may be mapped to the cabin coordinate system based on knowing the 3D position and orientation of the base of the gaze target projector in the cabin coordinate system. As such, when the gaze target projector is controlled to produce a projected gaze target at a projection point on an interior surface of the cabin, the 3D coordinates of that projected gaze target in the cabin coordinate system may be readily ascertained.

In some embodiments, ground truth gaze data may be generated using a gaze target projector by capturing (e.g., using a calibrated OMS sensor) image data (e.g., one or more image frames) of a test occupant's eyes and gaze direction. The image data is captured as the projected gaze targets are selectively projected onto an interior surface of the cabin and the test driver's gaze is directed at the projected gaze target. For example, a test operator may control the gaze target projector to produce a gaze target within the cabin, while an OMS sensor (e.g., a driver monitoring system (DMS) camera) captures image data of a test occupant. The OMS sensor may be positioned at a known 3D coordinate and pose with respect to the cabin coordinate system so that features of images captured by the OMS sensor may be translated to the cabin coordinate system. The projection of the gaze target should catch the test driver's attention as image frames capture the test occupant's eyes as their gaze is directed at the illumination of the projected gaze target. The captured image frames may be labeled (e.g., tagged) with the 3D coordinates of the projected gaze target to produce ground truth data corresponding to the training image. Additional ground truth gaze data may be generated in the same manner to produce a set of training data by sequentially generating additional projected gaze targets onto various different interior surfaces of the cabin while image frames capture the driver's (or other occupant's) eyes and gaze direction. In some embodiments, the gaze target projector may be controlled to process through a predetermined sequence of gaze target locations. Additionally or alternatively, the gaze target projector may be controlled to proceed through a random sequence of gaze target locations. The labeled ground truth gaze data may be used to train one or more machine learning models such as, but not limited to a DNN used by an OMS, or for other machine learning applications.

Because using the gaze target projector may include activating a laser within a cabin that is occupied by a test occupant, surfaces upon which the gaze targets are projected (e.g., windows, mirrors, instrument panels and/or dashboards) may comprise an anti-reflective surface treatment that attenuates and/or diffuses reflections. For example, an optical film that scatters light from the interior surface of the cabin (e.g., a film having a matte finish) may be applied to target surfaces (where gaze targets may be projected) such that the gaze target is still observable by the test occupant, but the luminosity of the light reaching the test occupant is below a specified exposure threshold.

In some embodiments, the gaze target projector is used in combination with one or more other ground truth data collection technologies to collect ground truth gaze data (e.g., such as an LED panel). For example, one or more LED panels may be placed on a surface that the gaze target projector is not able to be projected onto, such as a surface occluded by the presence of a test occupant. In some embodiments, illuminated gaze targets of LED panels may be interspersed within the sequence of gaze targets produced by the gaze target projector. Additionally or alternatively, the gaze target projector may be mounted to a repositionable platform in the cabin in order to generate projected gaze targets on different surfaces that otherwise may be occluded. In such embodiments, the 3D coordinates of the base of the gaze target projector may be derived for a repositioned gaze target projector using the fiducial point markers, as previously described, so that the position of projected gaze targets in 3D space (e.g., 3D coordinates) may be mapped to the cabin coordinate system. Additionally or alternatively, multiple gaze target projectors may be used in conjunction with each other in some embodiments. In some embodiments involving hybrid systems, where the ground truth gaze data is collected using a gaze target projector in combination with another ground truth data collection technology, the ground truth gaze data may be labeled to indicate whether a test occupant's direction of gaze as represented in an image was elicited by a gaze target produced from a gaze target projector or from another type of ground truth data collection technology.

As discussed herein, in some embodiments, the gaze target projector may be implemented using a robotic gaze target projector. For example, the gaze target projector may include a laser (or other visual projection emitter) that is mounted to a base via an assembly (e.g., a gimbal assembly) that may permit rotation of the laser with respect to the base in one or more degrees of freedom (e.g., about an azimuth axis and/or an elevation axis). The laser may include a laser range finder in order to measure a distance from the gaze target projector to the surface receiving the projected gaze target produced by the laser. In some embodiments, a separate range finder (e.g., a laser and/or ultrasonic range finder) may be coupled to the laser and aligned with the laser in order to measure the distance from the gaze target projector to the projected gaze target produced by the laser. The gaze target projector may include a motor (e.g., an azimuth motor) to control the position of the laser with respect to the azimuth axis. The gaze target projector may include a motor (e.g., an elevation motor) to control the position of the laser with respect to the elevation axis. In some embodiments, the azimuth and/or elevation motors may be individually controlled using a respective motor encoder that provides a closed loop feedback signal by tracking the position (and/or speed) of the motor shaft of the respective motor. The respective motor encoder may additionally, or alternatively, be used to define a zero or home position of the motor shaft(s), which may be used as a reference position for defining an origin (e.g., in polar coordinates) in the coordinate system of the gaze target projector. Based on feedback from the respective motor encoder, the controller of the gaze target projector may select a coordinate and rotate the laser to an angular position to point in the direction (e.g., azimuth, elevation) of the selected coordinate. In some embodiments, the controller may be implemented using one or more state machines to compute and/or track the position of gaze targets based on the angular position of the laser and range to the projected gaze target. The controller may be an integrated component of the gaze target projector, and/or coupled to the motors, motor encoders, lasers and/or range finder of the gaze target projector via a wired or wireless link. In some embodiments, a correspondence between the polar coordinate system of the gaze target projector and the 3D cabin coordinate system may be at least in part determined based on construction details of the gaze target projector. For example, the correspondence may be computed using known offsets (e.g., a predetermined Euclidean distance) between the coordinates of the one or more fiducial point markers on the base of the gaze target projector and the azimuth axis and/or an elevation axis about which the laser is rotated. In some embodiments, the controller may comprise a coordinate conversion algorithm to map motor shaft positions as determined using the feedback from motor encoders, and the known offsets from the fiducial point markers on the base of the gaze target projector, to determine the 3D coordinate(s) of a projected gaze target.

In some embodiments involving a hybrid implementation where the ground truth gaze data is collected using a gaze target projector in combination with another ground truth data collection technology (e.g., an LED panel), the controller may include, for example one or more state machines to compute and/or track the position of gaze targets produced by the other ground truth data collection technology. In some embodiments, the test operator inputs a test sequence profile that is used by the controller to automatically select and activate gaze targets (e.g., via a gaze target projector and/or other ground truth data collection technology) as images of the test occupant's gaze are captured.

In some embodiments, one or more functions of the controller may be implemented using one or more processors and/or on a cloud computing platform. The various functions of the controller may be executed at least in part on one or more graphics processing units that may operate in conjunction with software executed on a central processing unit coupled to a memory. The graphics processing units may be programmed, for example, to execute kernels to implement one or more functions for detecting fiducial point markers from captured images of the gaze target projector and/or computing gaze direction of occupants capture in the images.

As previously mentioned, in some embodiments the gaze target projector may include a heads-up display projector. For example, a heads-up display projector may be positioned within the cabin in a location where it can project and display patterns directly on surfaces like a windshield, windows, and/or other surfaces. The heads-up display projector may include one or more projection elements that when activated cause a projection of a gaze target on a surface of the cabin interior, even if the surface of the projection point is curved, small, or of irregular shape, as long as there is an unobstructed line of sight between the heads-up display projector and the desired projection point. In some embodiments, a base of the heads-up display projector includes one or more fiducial point markers that localize and facilitate determining a 3D position and orientation of the base of the heads-up display projector with respect to the cabin coordinate system. The 3D coordinates of projected gaze targets (in the cabin coordinate system) may be precomputed based on placement of the heads-up display projector at a designated location and known distance (e.g., a known throw distance) from the projection elements to the surface on which the gaze target is projected, and construction details of the heads-up display projector (e.g., known offset(s) between the projection element(s) producing the projected gaze target and the one or more fiducial point markers on the base of the heads-up display projector). In some such embodiments, the controller may determine the 3D coordinates of a projected gaze target based on which projection element is activated to produce the resulting projected gaze target, and label images of the test occupant's gaze based on the 3D coordinates of the projected gaze target. In various embodiments, one or more heads-up display projectors may be used in conjunction with one or more robotic gaze target projectors, and/or other ground truth data collection technology (e.g., an LED panel).

In some embodiments, the heads-up display projector may be an integrated component of a vehicle or machine, such as a projector used to display instrumentation readings or augmented reality images on a windshield, window, and/or other surface. As such, in some embodiments, the OMS may automatically initiate a runtime OMS sensor calibration while the vehicle remains in service using the one or more heads-up display projectors to project gaze targets. Initiation of the runtime OMS sensor calibration may be triggered periodically (e.g., based on time and/or mileage driven), and/or triggered based on other factors. For example, in some embodiments, an OMS sensor used to observe occupant gaze may be mounted within a driver adjustable component (e.g., a steering wheel column). After adjustment of the component, the OMS system may initiate a recalibration where the heads-up display projector controls one or more projection elements to project a series of sequential gaze targets on a surface of the cabin interior, while the OMS sensor captures one or more images of an occupant's gaze while observing the projected gaze targets. The OMS may adjust one or more calibration parameters based on observed gaze directions from the images, and the 3D coordinates of the projected gaze targets.

While embodiments presented in this disclosure may be implemented in the context of vehicle occupant monitoring systems (including driver monitoring systems) for vehicles such as, but not limited to, non-autonomous vehicles, semi-autonomous vehicles, piloted and un-piloted robots or robotic platforms, warehouse vehicles, off-road vehicles, vehicles coupled to one or more trailers, aircraft, spacecraft, boats, shuttles, emergency response vehicles, construction vehicles, underwater craft, drones, and/or other vehicle types, other embodiments other embodiments may include determining extrinsic calibration parameters for sensors that capture image frames of other interior spaces, such as rooms, warehouses, gymnasiums, containers, and/or studios.

With reference to FIG. 1, FIG. 1 is an example data flow diagram illustrating the interconnection of components and flow of information or data for a ground truth gaze data collection system 110, which may be used for training components of an ego-machine (such as autonomous vehicle 1200 discussed below with respect to FIG. 12A), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1200 of FIGS. 12A-12D, example computing device 1300 of FIG. 13, and/or example data center 1400 of FIG. 14.

As shown in FIG. 1, the process 100 may include a ground truth training data collection system 110 that generates ground truth gaze data 122 by capturing (e.g., using a calibrated OMS sensor 101) sensor data 102 (e.g., image data comprising one or more image frames) of a test driver's eyes and gaze direction. The sensor data 102 may be captured by the ground truth training data collection system 110 as a gaze target projector 130 is controlled to selectively project a gaze target onto an interior surface of the cabin (e.g., of autonomous vehicle 1200) and the test occupant's gaze is directed at the projected gaze targets. The sensor data 102 may be labeled (e.g., tagged) with the 3D coordinates of the projected gaze target to produce ground truth data 122 corresponding to a training image. Additional ground truth gaze data 122 may be generated in the same manner to produce a gaze training dataset 140 by controlling the gaze target projector 130 to sequentially generate additional projected gaze targets onto various interior surfaces of the cabin while sensor data 102 capture the driver's (or other occupant's) eye(s) and gaze direction. The labeled ground truth gaze data 122 included in the gaze training dataset 140 may be used to train and/or adjust one or more parameters of one or more machine learning models such as, but not limited to, a DNN used by an OMS, or for other machine learning applications.

The sensor data 102 may include, without limitation, sensor data 102 from any type and number of optical sensor(s) (e.g., RGB sensor(s), Infrared (IR) sensor(s), depth sensor(s), camera(s), and/or other optical sensor(s)) such as but not limited to those described herein with respect to the vehicle 1200 and/or other vehicles or objects-such as robotic devices, VR systems, AR systems, mixed reality systems, etc., in some examples. As a non-limiting example, and with reference to FIGS. 12A-12C, the sensor data 102 may include the data generated by, without limitation, RADAR sensor(s) 1260, ultrasonic sensor(s) 1262, LIDAR sensor(s) 1264, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, in-cabin cameras, in-cabin heat, pressure or touch sensors, in-cabin motion sensors, and/or other sensor types.

In some embodiments, the sensor data 102 may correspond to sensor data comprising 2D image frames generated using one or more in-cabin OMS sensors 101, such as one or more in-cabin cameras, in-cabin near-infrared (NIR) sensors, in-cabin microphones, and/or the like. The sensor data 102 may correspond to sensors with a sensory field or field of view internal to the vehicle 1200 (e.g., cameras with the occupant(s), such as the driver, in its field of view). In some embodiments, the sensor data 102 may also correspond to sensor data generated using one or more external sensors of the vehicle 1200, such as one or more cameras, RADAR sensor(s) 1260, ultrasonic sensor(s) 1262, LIDAR sensor(s) 1264, and/or the like. As such, sensor data 102 may also correspond to sensors with a sensory field or field of view at least partially external to the vehicle 1200 (e.g., cameras, LiDAR sensors, etc. with sensory fields including the environment exterior to the vehicle 1200).

As illustrated in FIG. 1, in some embodiments, the ground truth training data collection system 110 may include a gaze target selection controller 112, a gaze target controller 116, a gaze target coordinate mapping function 118 and a ground truth image data labeling function 120. The selection of gaze targets may be performed by the gaze target selection controller 112. In some embodiments, a test operator (e.g., via a human machine interface 105) may input to the gaze target selection controller 112 a selection of one or more gaze targets for the gaze target projector to sequentially project while the sensor data 102 is collected. In some embodiments, the gaze target selection controller 112 may receive a predetermined selection of gaze targets from gaze target selection sequence data 114 for the gaze target projector to sequentially project while the sensor data 102 is collected. To generate a selected projected gaze target, the gaze target selection controller 112 may output a target selection signal 113 to the gaze target controller 116. For example, the target selection signal 113 may include a set of rotation coordinates (e.g., an azimuth and elevation) indicating a direction where the gaze target projector 130 should point to product the projected gaze target. Based on the target selection signal 113, the gaze target controller 116 generates one or more projector control signals 115 to control the gaze target projector 130 to rotate to the designated rotation coordinates. When the gaze target controller 116 determines that the gaze target projector 130 reaches the designated rotation coordinates (e.g., based on feedback 131 from the gaze target projector 130), the gaze target controller 116 may control the gaze target projector 130 to activate a visual projection emitter (e.g., a laser) to produce the projected gaze targets onto the interior surfaces of the cabin, and activate a range finding sensor to measure a distance (which may be referred to herein as projection depth data) from the gaze target projector 130 to the target point where the projected gaze target appears. The rotation coordinates may be provided (as shown at 117) by the gaze target controller 116 to the gaze target coordinate mapping function 118, and the projection depth data may be provided (as shown at 132) by the gaze target projector 130 to the gaze target coordinate mapping function 118. The set of rotation coordinates 117 together with projection depth data 132 may represent 3D coordinates of a position of the projected gaze target with respect to the 3D polar coordinate system of the gaze target projector 130. As further discussed below, the gaze target coordinate mapping function 118 may convert the 3D coordinates of a position of the projected gaze target with respect to the 3D polar coordinate system into a 3D coordinate (e.g., a Cartesian coordinate) of the cabin coordinate system, and outputs the 3D coordinate 119 in the cabin coordinate system to the ground truth image data labeling function 120. The sensor data 102 capturing the test occupant's eyes and gaze direction while the projected gaze target is illuminated may be labeled (e.g., tagged) by the ground truth image data labeling function 120 with the 3D coordinates 119 of the projected gaze target to produce ground truth data 122. In some embodiments, the gaze target projector may be controlled to process through a predetermined sequence of gaze target locations. Additionally or alternatively, the gaze target projector may be controlled to proceed through a random sequence of gaze target locations. The labeled ground truth gaze data 122 may be used to train one or more machine learning models such as, but not limited to a DNN used by an OMS, or for other machine learning applications.

Figure 2:
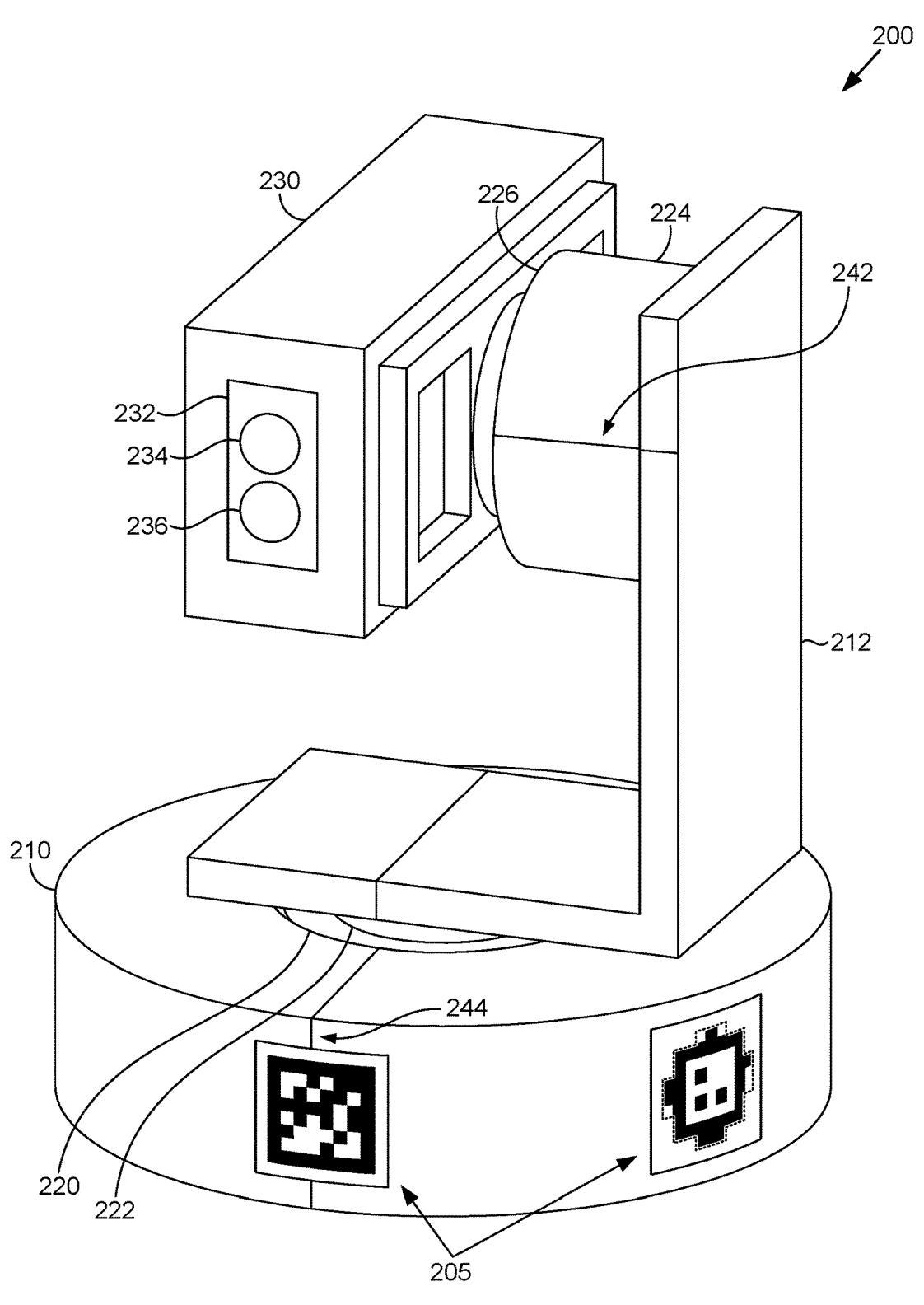
FIG. 2 is an illustration of an example robotic gaze target projector, in accordance with some embodiments of the present disclosure.

Referring now to FIG. 2, FIG. 2 illustrates a robotic gaze target projector 130, which may be used to implement the gaze target projector 130, in accordance with some embodiments of the present disclosure. Gaze target projector 200 may comprise a mounting arm 212 rotatably coupled to a base 210 and further rotatably coupled to a projector member 230. In some embodiments, the base 210 and mounting arm 212 form a set of gimbals for pivoting the projector member 230 with respect to a set of orthogonal pivot axes (e.g., an elevation axis and an azimuth axis). The base 210 and mounting arm 212 may be coupled via a first motor 222 (e.g., an azimuth motor) to control the rotational position (e.g., the rotational orientation) of the projector member 230 with respect to the azimuth axis. In some embodiments, an azimuth motor encoder 220 tracks the position (and/or speed) of a motor shaft of the azimuth motor 220 to provide closed loop feedback signal to the gaze target controller 116 for controlling and/or monitoring the rotation of the projector member 230 with respect to the azimuth axis. Similarly, the projector member 230 and mounting arm 212 may be coupled via a second motor 224 (e.g., an elevation motor) to control the rotational position of the projector member 230 with respect to the elevation axis. In some embodiments, an elevation motor encoder 226 tracks the position (and/or speed) of a motor shaft of the elevation motor 224 to provide closed loop feedback signal to the gaze target controller 116 for controlling and/or monitoring the rotation of the projector member 230 with respect to the elevation axis. In some embodiments, the azimuth motor encoder 220 may define an azimuth origin 244 (e.g., azimuth coordinate of zero degrees) for positioning the projector member 230 based on monitoring the motor shaft of the azimuth motor 220. Similarly, the elevation motor encoder 226 may define an elevation origin 242 (e.g., elevation coordinate of zero degrees) for positioning the projector member 230 based on monitoring the motor shaft of the elevation motor 220.

As shown in FIG. 2, the projector member 230 may include a visual projection emitter 234 (e.g., a laser and/or LED device) which when activated generates the projected gaze target on the cabin surface. The projector member 230 may include a range finding sensor 236 (e.g., a laser range finder, an ultrasonic range finder) to determine a distance from the gaze target projector to the target point where the projected gaze target appears. The visual projection emitter 234 and range finding sensor 236 may be separate devices or at least partially integrated together as a visual projection emitter/range finding sensor 232 (e.g., such as a laser range finder that uses a visible laser).

In some embodiments, the base 210 of the gaze target projector 200 may include one or more fiducial point markers 205 (e.g., AprilTag patterns, ARtag patterns, and/or other patterns) that localize and facilitate determining a 3D position and orientation of the base of the gaze target projector 220 (e.g., the pose of gaze target projector 200) with respect to the cabin coordinate system. As explained in greater detail below with respect to FIG. 5, by capturing an image frame of the gaze target projector 200 and the one or more fiducial point markers 205, a projector pose transform may be computed and used by the target coordinate mapping function to translate the set of rotation coordinates 117 and projection depth data 132 from 3D coordinates of the gaze target projector 130 to 3D coordinates 119 of the cabin coordinate system for to the ground truth image data labeling function 120.

Figure 3:
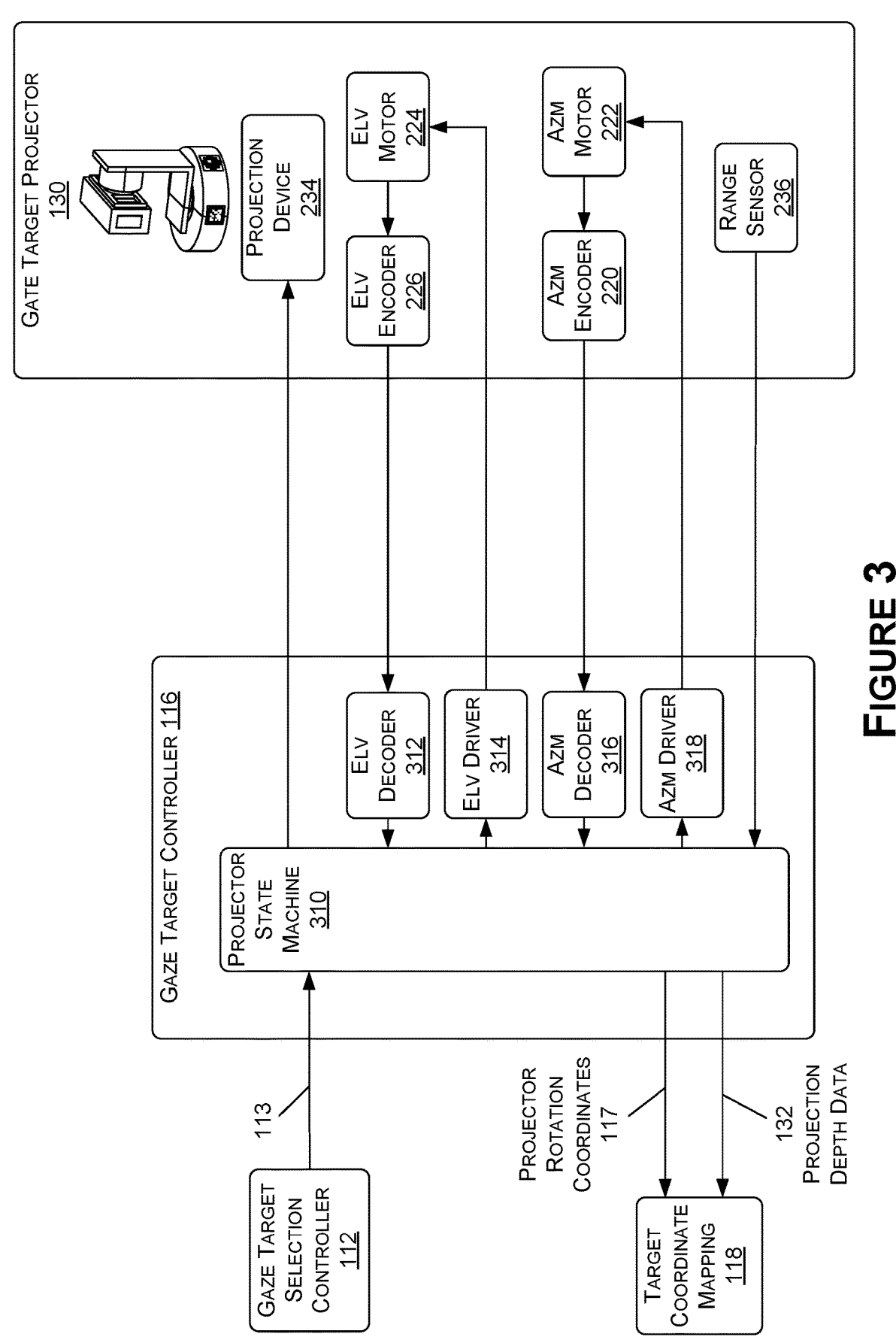
FIG. 3 is an illustration of an example gaze target controller, in accordance with some embodiments of the present disclosure.

Referring now to FIG. 3, FIG. 3 further illustrates the gaze target controller 116 interacting in conjunction with a gaze target projector 130 (e.g., such as a robotic gaze target projector 200), in accordance with some embodiments of this disclosure. In some embodiments, the gaze target controller 116 may be an integrated component of the gaze target projector 130. In some embodiments, the gaze target controller 116 may be a separate component from the gaze target projector 130, and/or coupled to the gaze target projector 130 by one or more wired or wireless links.

As shown in FIG. 3, the gaze target controller 116 may include at least one projector state machine 310. The projector state machine 310 may receive the target selection signal 113 from the gaze target selection controller 112 (e.g., a set of rotation coordinates (e.g., an azimuth and elevation) indicating a direction where the gaze target projector 130 should point to product the projected gaze target). In some embodiments, based on the target selection signal 113, the projector state machine 310 controls an elevation driver 314 (coupled to the elevation motor 224) to control the rotation of the projector member 230 with respect to the elevation axis and position the projector member 230 as indicated by the target selection signal 113. An elevation decoder 312 of the gaze target controller 116 may receive the measurement of motor shaft rotation generated by the elevation encoder 226 in response to activation of the elevation motor 224 and decode the measurement into an elevation coordinate (e.g., with respect to elevation origin 242) that is used by the projector state machine 310 to track the position of a projected gaze target. In some embodiments, based on the target selection signal 113, the projector state machine 310 controls an azimuth driver 318 (coupled to the azimuth motor 222) to control the rotation of the projector member 230 with respect to the azimuth axis and position the projector member 230 as indicated by the target selection signal 113. An azimuth decoder 316 of the gaze target controller 116 may receive the measurement of motor shaft rotation generated by the azimuth encoder 220 in response to activation of the azimuth motor 222 and decode the measurement into an azimuth coordinate (e.g., with respect to azimuth origin 244) that is used by the projector state machine 310 to track the position of a projected gaze target. When the feedback from the azimuth decoder and elevation encoder 226 indicates that the projector member 230 has reached an orientation corresponding to the target selection signal 113, the projector state machine 310 may activate the visual projection emitter 234 to produce the protected gaze target. In some embodiments, with the visual projection emitter 234 activated, the projector state machine 310 may determine a distance from the gaze target projector to the target point where the projected gaze target appears using the range finding sensor 236. Projected rotation coordinates 117 (e.g., as tracked using feedback from the encoders 220 and 226) and protection depth data (e.g., based on measurements using the range finding sensor 236) may be output by the projector state machine 310 to the target coordinate mapping function 118.

Figure 4:
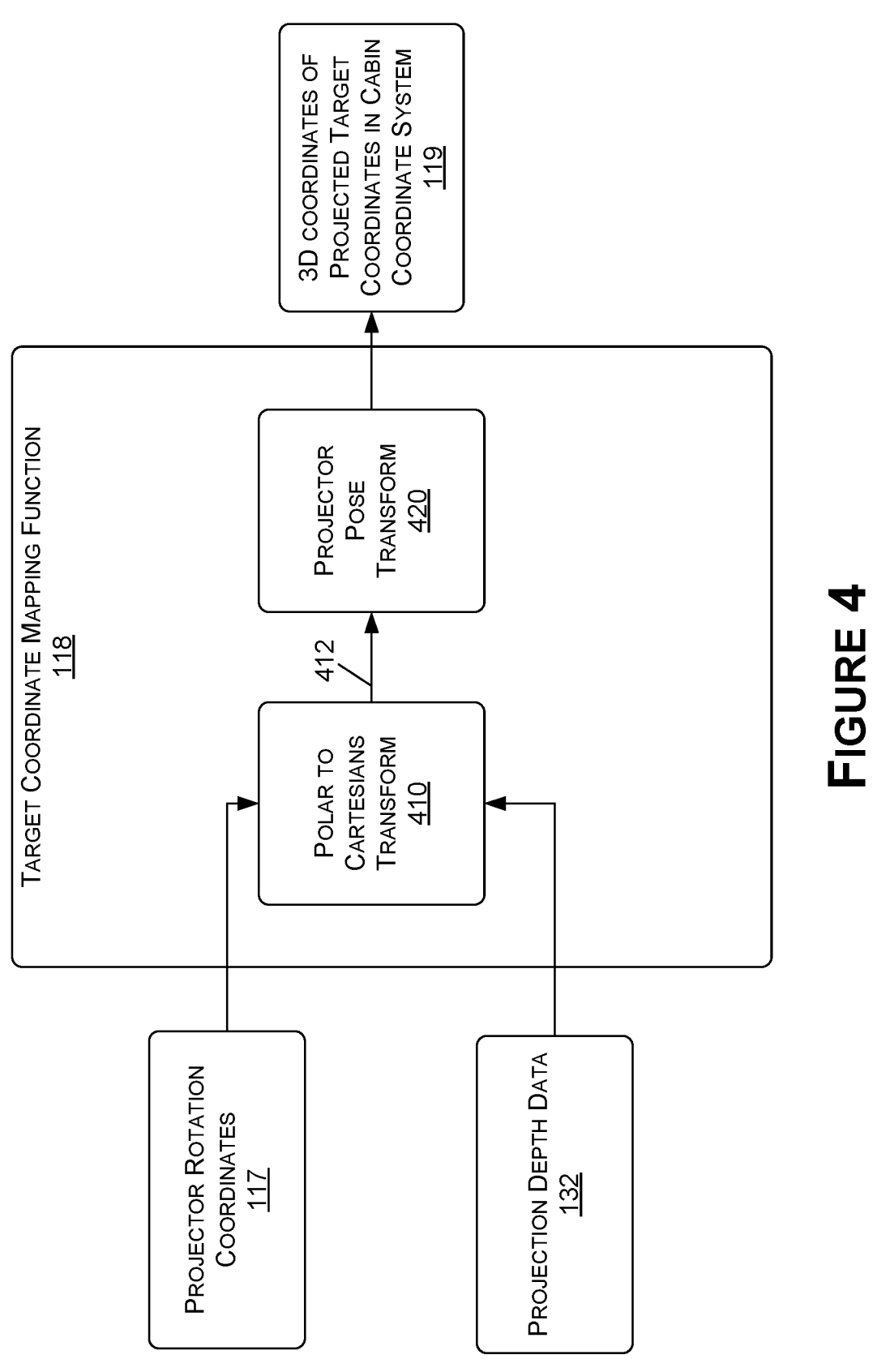
FIG. 4 is an illustration of an target coordinate mapping function, in accordance with some embodiments of the present disclosure.

Referring now to FIG. 4, FIG. 4 further illustrates a coordinate mapping function 118, in accordance with some embodiments of this disclosure. In some embodiments, the coordinate mapping function 118 inputs the rotation coordinates 117 (e.g., comprising polar coordinates azimuth and elevation coordinates) and projection depth data 132 (comprising a distance) and performs a polar to Cartesian transform 410 to map those polar coordinates into a set of 3D Cartesian coordinates 412 with respect to a 3D coordinate system of the gaze target projector. That is, 3D Cartesian coordinates 412 may comprise a set of x, y, z, Cartesian coordinates representing a position of the protected gaze target with respect to an origin defined by the location of the gaze target projector 130 (e.g., which may be defined using the fiducial point markers 205). Using a projector pose transform 420, the coordinate mapping function 118 may convert the 3D Cartesian coordinates 412 into the 3D coordinates 119 of the cabin coordinate system. As discussed below with respect to FIG. 5 the projector pose transform 420 may account for the extrinsic parameters may refer to factors that describe the physical orientation of the gaze target projector 130, such as rotation and translation (also referred to as roll and tilt) with respect to the cabin coordinate system.

Figure 5:
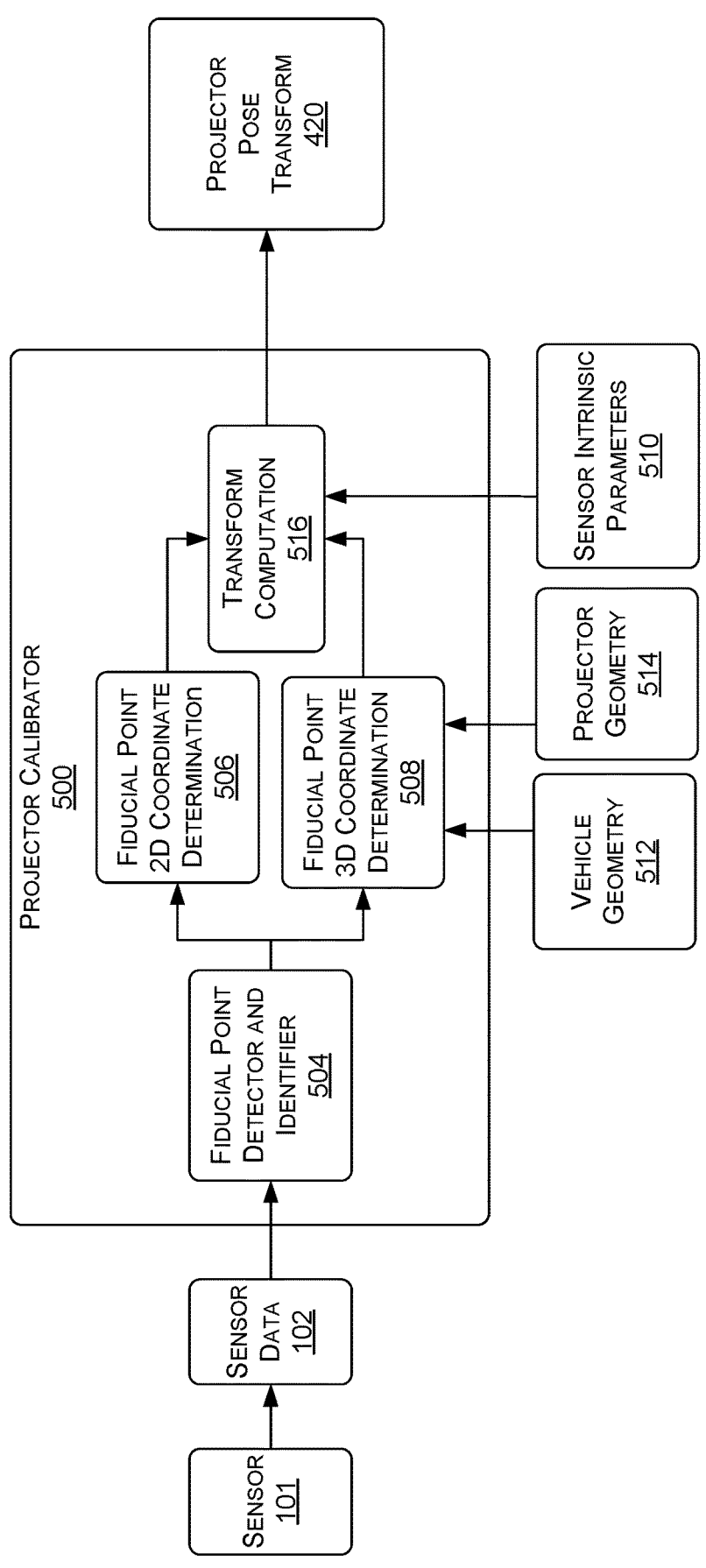
FIG. 5 is an illustration of an example projector calibrator, in accordance with some embodiments of the present disclosure.

Referring now to FIG. 5, FIG. 5 illustrates a projector calibrator 500 which may be used to compute the projector pose transform 420 based on sensor data 102 capturing an image frame of the gaze target projector 120 and the one or more fiducial point markers 205. A rotation-translation transform corresponding to gaze target projector 130 may be computed by a projector calibrator 500 that may comprise, for example, a fiducial point detector and identifier 504, a fiducial point 2D coordinate determination function 506, a fiducial point 3D coordinate determination function 508, and a transform computation function 516. Input to the calibrator 500 may include one or more of, but not limited to, sensor data 102, sensor intrinsic parameters 510 (e.g., focal length parameters $f_x$ and $f_y$, sensor principal point parameters $u_0$ and $v_0$ and/or an optical distortion coefficient $\gamma$ of sensor 101), vehicle geometry 512, and projector geometry 514.

In some embodiments, the projector calibrator 500 may be functionally integrated as a component of the occupant monitoring system of a vehicle 1200 and/or of the ground truth training data collection system 110. The ground truth training data collection system 110 may, for example, use the rotation-translation transform as the projector pose transform 420. The fiducial point detector and identifier 504 may analyze the sensor data 102 to detect the presence of the one or more fiducial points 205 on the base 210 (or other location) of the gaze target projector 130. The fiducial point detector and identifier 504 may execute one or more machine learning algorithms, deep neural networks, computer vison algorithms, image processing algorithms, mathematical algorithms, and/or other technologies, to determine whether images of one or more fiducial points are represented by or correspond to the sensor data 102 and/or which portion of the sensor data 102 (or a representation thereof) includes the one or more fiducial points. For example, the fiducial point detector and identifier 504 and/or other components of the protector calibrator 500, may be implemented using any type of machine learning model or algorithm, such as a machine learning model(s) using linear regression, logistic regression, decision trees, support vector machines (SVM), Naïve Bayes, k-nearest neighbor (k-NN), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of algorithms or machine learning models.

For a set of one or more of the fiducial points 205 detected by the fiducial point detector and identifier 504, the fiducial point 2D coordinate determination function 506 determines a 2D coordinate within the image space of an image frame of sensor data 102. 2D coordinates (e.g., u, v) may be established for a fiducial point 205 based on the location of the fiducial point 205 with respect to the image space of the sensor data 102. For the set of one or more of the fiducial points 205 detected by the fiducial point detector and identifier 504, the projector calibrator 500 uses the fiducial point 3D coordinate determination function 508 to determine a 3D coordinate with respect to the cabin coordinate system. For example, the fiducial point 3D coordinate determination function 508 may reference vehicle geometry 512 to lookup a known 3D coordinate corresponding to the placement of the gaze target projector 130. The vehicle geometry 512 may include information regarding the structure of the interior of the vehicle or machine interior, for example from Computer Assisted Drawing (CAD) models, or similar models or specifications, used for manufacturing the vehicle or other machine type (e.g., aircraft, water-based vehicle, robot, drone, construction equipment, warehouse vehicle, etc.). For instance, the vehicle geometry 512 may include a three-dimensional coordinate system that is mapped to the interior of the vehicle or machine and may include information such as the 3D coordinates, size, and/or orientation of one or more designate positions where the gaze target projector 130 may be placed. In some embodiments, a correspondence between the polar coordinate system of the gaze target projector 130 and the 3D cabin coordinate system may be at least in part defined based on construction details of the gaze target projector 130 represented in projector geometry 514. The projector geometry 514 may describe the relationship between the geometry of the gaze target projector and one or more fiducial points located on the gaze target projector. For example, the projector geometry 514 may define a correspondence between the position of the one or more fiducial points 205 in the 3D cabin coordinate system and the azimuth axis and/or an elevation axis about which the projector member 230 is rotated. The correspondence may be based on known offsets (e.g., a Euclidean distance) between the coordinates of the one or more fiducial point markers 205 on the base 210 of the gaze target projector 130 and the azimuth axis and/or an elevation axis. In some embodiments, the controller may comprise a coordinate conversion algorithm to map motor shaft positions as determined using the feedback from motor encoders, and the known offsets from the fiducial point markers on the base of the gaze target projector, to determine the 3D coordinate(s) of a projected gaze target.

The fiducial point 3D coordinate determination function 508 may thus further compute coordinates of origin point for the azimuth axis and/or an elevation axis with respect to the 3D cabin coordinate system. The projector calibrator 500 may apply transform computation 516, which comprises a pose computation algorithm to compute a rotation-translation transform for projector member 230. For example, transform computation 516 may compute a rotation-translation transform as a rotation-translation matrix comprising rotation vector (R) and translation vector (T) that may be used for the projector pose transform 420. In some embodiments, the pose computation algorithm may include one or more computer vision algorithms such as an algorithm based on the OpenCV (open source computer vision library), Eigen library, bundle adjustment optimization, RANSAC optimization, or other algorithm. Further information on computing rotation-translation transforms using 2D image frames is provided by U.S. patent application Ser. No. 17/935,473, titled "MULTI-MODAL SENSOR CALIBRATION FOR IN-CABIN MONITORING SYSTEMS AND APPLICATIONS" filed, Sep. 26, 2022, and U.S. patent application Ser. No. 17/935,465, titled "SENSOR CALIBRATION USING FIDUCIAL MARKERS FOR IN-CABIN MONITORING SYSTEMS AND APPLICATIONS" filed Sep. 26, 2022, each of which are incorporated herein in their entirety.

Figure 6:
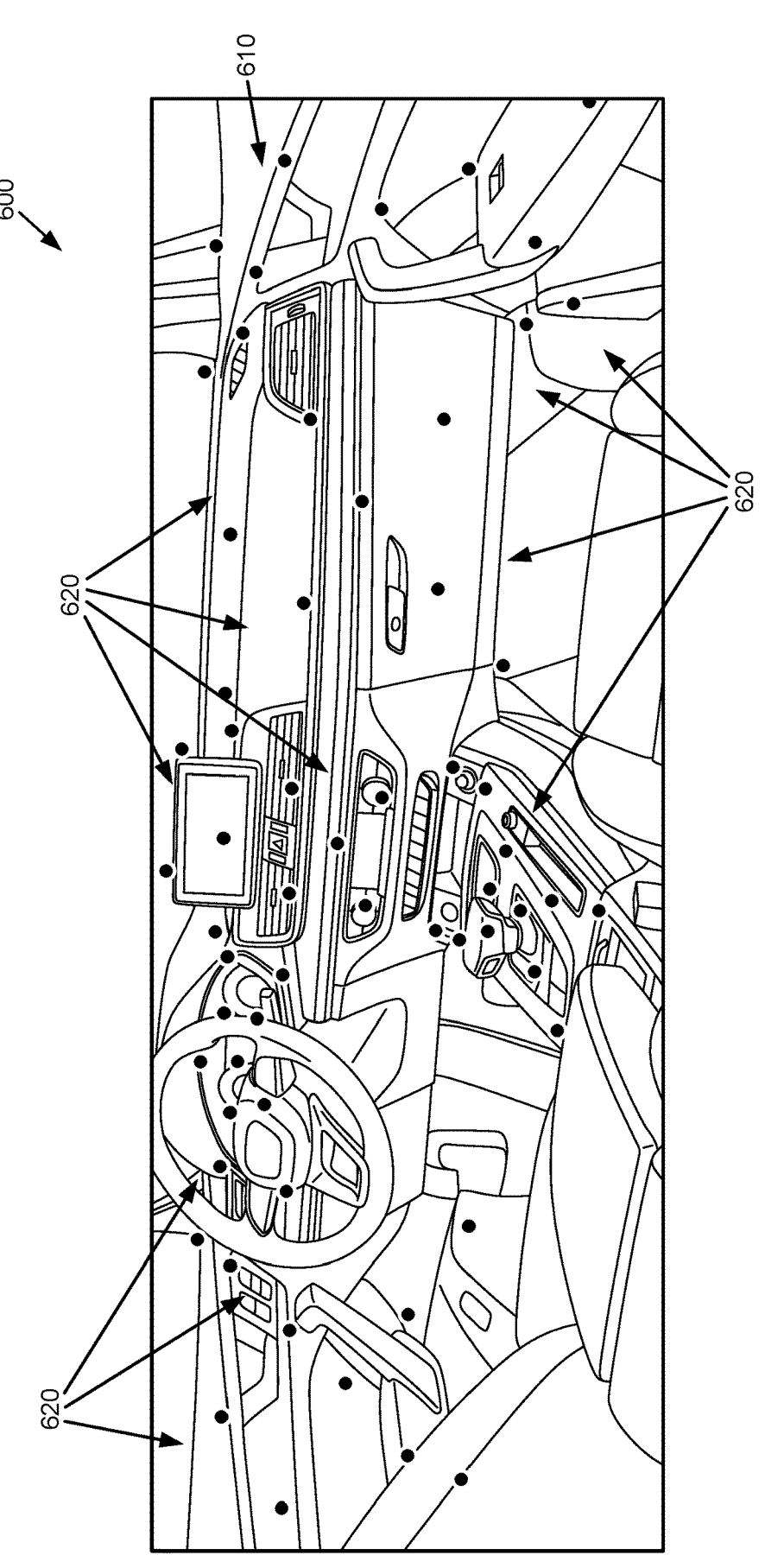
FIG. 6 is an illustration of an example of projected gaze targets projected into a cabin interior, in accordance with some embodiments of the present disclosure.

Referring now to FIG. 6, FIG. 6 at 600 illustrates an cabin interior 610 where a plurality of example projected gaze targets 620 are illuminated onto various positions of cabin surfaces. Because a beam of light may be used to produce the projected gaze target, the projected gaze targets 620 may be produced at projection points on various surfaces of the cabin interior, even if the surface at the projection point is curved, small, or an irregular shape, as long as there is an unobstructed line of sight between the gaze target projector 130 and the desired projection point 620.

Figure 7:
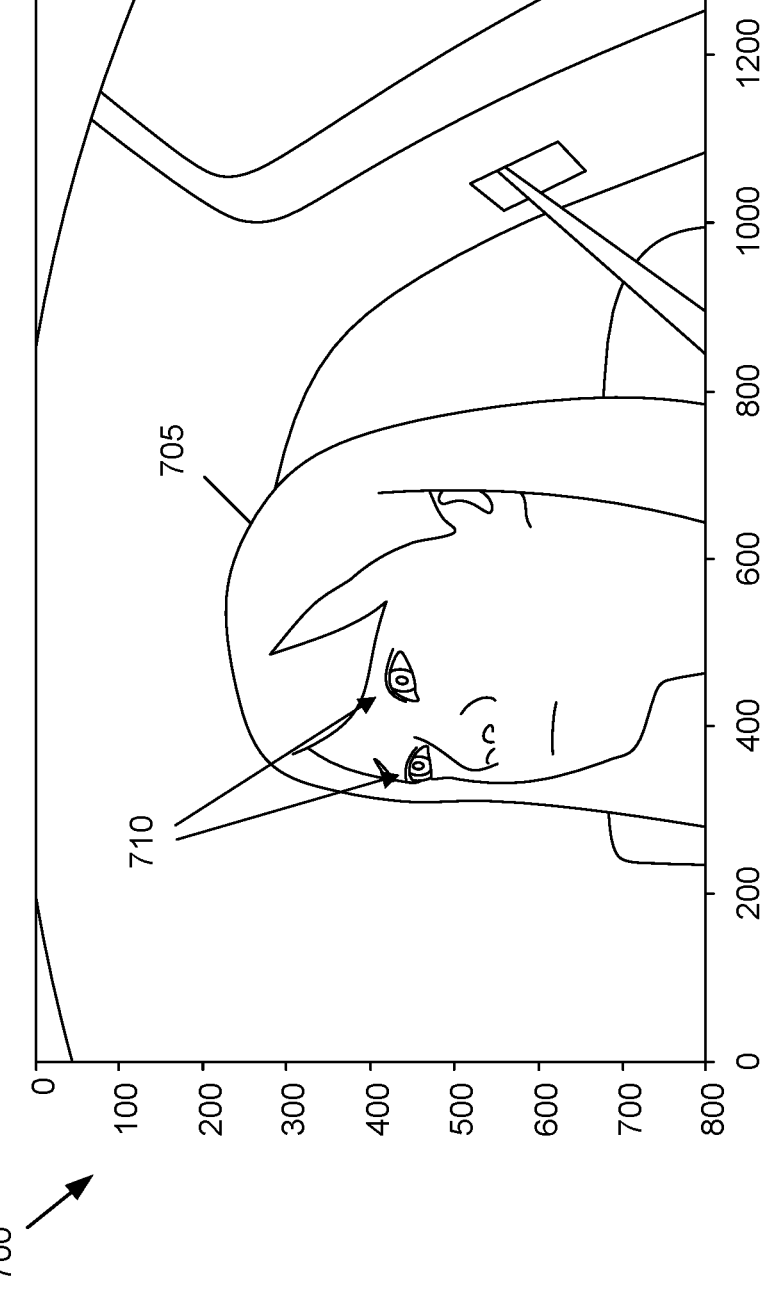
FIG. 7 is example illustration of an image for ground truth gaze data, in accordance with some embodiments of the present disclosure.

For example, a test operator of the ground truth training data collection system 110 may sequentially illuminate projected gaze targets 620 while sensor 101 captures images of a test occupant 705 seated in the driver's seat such as image frame 700 shown in FIG. 7. The illumination of a projected gaze target 620 will catch the test occupant's attention as image frames capture the test occupant's eyes 710 as their gaze is directed at the projected gaze target 620. Because the 3D coordinates of the individual projected gaze target 620 with respect to the cabin coordinate system are known from the 3D coordinates 119, the image frame 700 may be labeled by the ground truth image data labeling function 120 with the 3D coordinates of the first gaze target in the cabin coordinate system, to produce an image sample of ground truth gaze data 122. Additional ground truth gaze data 122 may be generated in the same manner to produce the gaze training dataset 140 by sequentially generating additional projected gaze targets 620 onto various different interior surfaces of the cabin while the OMS sensor 101 captures the driver's (or other occupant's) eyes and gaze direction.

Additionally or alternatively, the gaze target projector 130 may be mounted to a repositionable platform (e.g., within the cabin) in order to generate projected gaze targets 620 on different surfaces that otherwise may be occluded by elements within the cabin. In such embodiments, the 3D coordinates of the base of the gaze target projector 130 may be derived for a repositioned gaze target projector using the fiducial point markers 205, as previously described, so that the 3D coordinates of projected gaze targets 620 may be mapped to the cabin coordinate system. Additionally or alternatively, multiple gaze target projectors 130 may be used in conjunction with each other in some embodiments to produce the gaze training dataset 140.

Figure 8:
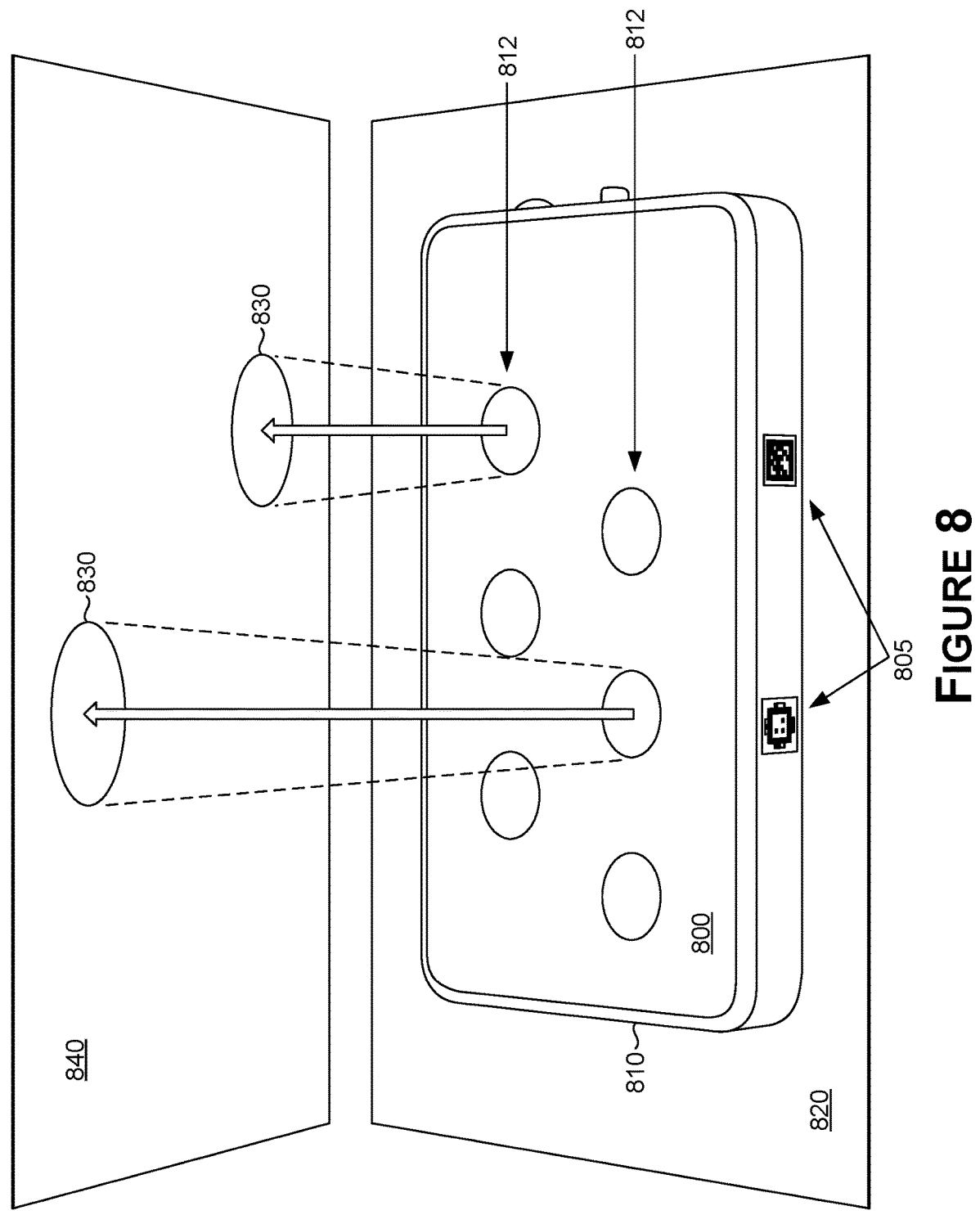
FIG. 8 is an illustration of an example head-up display gaze target projector, in accordance with some embodiments of the present disclosure.

Now referring to FIG. 8, FIG. 8 is a diagram of another example at 800 of a gaze target projector which may be used as the gaze target projector 130 in conjunction with the ground truth training data collection system 110 of FIG. 1. In this example, the gaze target projector 800 may comprise a heads-up display projector that may be used to project projected gaze targets 620 onto the surfaces of the cabin interior (e.g., windshield, windows, and/or other surfaces).

The gaze target projector 800 may include a base that comprises one or more projection elements 812. When a projection element 812 is activated, light emitted by that projection element 812 produces a projected gaze target 830 on a surface 840 of the cabin interior. Similar to the gaze target projector 200, the projected gaze targets 830 generated by the gaze target projector 800 may be produced at projection points even where the surface 840 is curved, small, or of irregular shape, as long as there is an unobstructed line of sight between the gaze target projector 800 and the desired projection point. In some embodiments, the base 810 of the gaze target projector 800 may include one or more fiducial point markers 805 that localize and facilitate determining a 3D position and orientation of the base 810 of the gaze target projector 800 with respect to the cabin coordinate system (e.g., such as a processed described above using the fiducial point markers 205). The 3D coordinates of projected gaze targets 830 (e.g., in the cabin coordinate system) produced by the gaze target projector 800 may be precomputed based on placement of the gaze target projector 800 at a designated location on a surface 820 within the cabin, and known distance (e.g., a known throw distance) from the activated projection element 812 to the surface 840 on which the gaze target 830 is projected, and construction details of the gaze target projector 800 (e.g., known offset(s) between the projection element 812 producing the projected gaze targets 830 and the one or more fiducial point markers 805 on the base 810 of the heads-up display projector). In some such embodiments, the target coordinate mapping function 118 (or other element of the ground truth training data collection system 110) may determine the 3D coordinates of a projected gaze target 830 based on which projection element 812 is activated to produce the resulting projected gaze target 830, and label images of the test occupant's gaze based on the 3D coordinates of the projected gaze target 830. The sensor data 102 may be captured by the ground truth training data collection system 110 as the gaze target projector 800 is controlled to selectively project a gaze target 830 onto the interior surface 840, and the test occupant's gaze is directed at the projected gaze targets. The sensor data 102 may be labeled (e.g., tagged) with the 3D coordinates of the projected gaze target 830 to produce ground truth data 122 corresponding to a training image. Additional ground truth gaze data 122 may be generated in the same manner to produce a gaze training dataset 140 by controlling the gaze target projector 130 to sequentially generate additional projected gaze targets onto various different interior surfaces of the cabin while sensor data 102 capture the driver's (or other occupant's) eyes and gaze direction.

In some embodiments, the gaze target projector 800 as shown in FIG. 8 may be used together with a gaze target projector 200 as shown in FIG. 2 to implement the ground truth training data collection system 110 of FIG. 1. In such embodiments, the gaze training dataset 140 may include images of ground truth gaze data 122 collected using both a gaze target projector 200 (e.g., a robotic gaze target projector) and gaze target projector 800 (e.g., a head-up gaze target projector). In some embodiments, an image of ground truth gaze data 122 may be further labeled to indicate the type of gaze target projector 130 (e.g., a gaze target projector 200 verses a heads-up gaze target projector) that was used to generate that image sample of ground truth gaze data 122).

In some embodiments, the gaze target projector 800 may be an integrated component of a vehicle or machine, such as a heads-up projector used to display instrumentation readings or augmented reality images on a windshield, window, and/or other surface. In some embodiments, an OMS may initiate (e.g., either automatically and/or in response to a user command) a runtime OMS sensor calibration using a gaze target projector 800 using a built-in heads-up display projector to project a sequence of gaze target 830 to collect ground truth gaze data 122 as described above.

Now referring to FIG. 9, FIG. 9 is a flow diagram showing a method 800 for generating ground truth gaze data (such as ground truth gaze data 122), in accordance with some embodiments of the present disclosure. It should be understood that the features and elements described herein with respect to the method 900 of FIG. 8 may be used in conjunction with, in combination with, or substituted for elements of, any of the other embodiments discussed herein and vice versa. Further, it should be understood that the functions, structures, and other descriptions of elements for embodiments described in FIG. 9 may apply to like or similarly named or described elements across any of the figures and/or embodiments described herein and vice versa.

Each block of method 900, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 900 is described, by way of example, with respect to the ground truth training data collection system 110 of FIG. 1. However, this method may additionally or alternatively be executed by any one system, or any combination of systems, including, but not limited to, those described herein.

The method 900, at block B902, includes controlling a gaze target projector to cause a projection of a gaze target to appear on a surface of an interior space. Gaze targets generated by a gaze target projector are produced by directing a beam of light at selected projection point on a surface within an interior space (e.g., cabin, cockpit) of a vehicle or other machine. Such projected gaze targets (as illustrated in FIG. 6) may be produced at projection points on various surfaces of the cabin interior, even if the surface at the projection point is curved, small, or an irregular shape, as long as there is an unobstructed line of sight between the gaze target projector and the desired projection point. The gaze target projector may comprise a robotic gaze target projector (e.g., such as illustrated in in FIG. 2) where the gaze target projector is rotated on one or more axes to direct a visual projection emitter (e.g., a laser and/or LED device) to aim at the desired projection point and activate to produce the projected gaze target. The gaze target projector may comprise a heads-up display projector (e.g., such as illustrated in FIG. 8) that includes a based that comprises one or more projection elements. When a projection element is activated, light emitted by that projection element produces a projected gaze target on a surface of the cabin interior. In some embodiments, a gaze target projector may be controlled to produce the projected gaze target at the desired projection point by a gaze target controller (e.g., such as illustrated in FIG. 8). For example, the gaze target controller may control the rotation of a robotic gaze target projector and/or selectively activate projection elements of a heads-up display projector to produce the projected gaze target at the desired projection point.

The method 900, at block B904, includes determining a position in a three-dimensional (3D) space corresponding to a location of the projection of the gaze target. For example, for an embodiment using a robotic gaze target projector (e.g., such as gaze target projector 200), 3D coordinates of a projected gaze target may initially be established in terms of polar coordinates (altitude, elevation, depth) with respect to the gaze target projector, then transformed Cartesian coordinates with respect to the gaze target projector, which in turn may be mapped to the cabin coordinate system based on knowing the 3D position and orientation of the base of the gaze target projector in the cabin coordinate system. For example, in some embodiments, the coordinate mapping function 118 inputs the rotation coordinates 117 (e.g., comprising polar coordinates azimuth and elevation coordinates) and projection depth data 132 (comprising a distance) and performs a polar to Cartesian transform to map those polar coordinates into a set of 3D Cartesian coordinates 412 with respect to a 3D coordinate system of the gaze target projector. Using a projector pose transform 420, the coordinate mapping function 118 may convert the 3D Cartesian coordinates 412 into the 3D coordinates 119 of the cabin coordinate system. For an embodiment using a heads-up display gaze target projector (e.g., such as gaze target projector 800), 3D coordinates of projected gaze targets 830 produced by the gaze target projector 800 may be precomputed based on placement of the gaze target projector 800 at a designated location on a surface 820 within the cabin, and a known distance from the activated projection element 812 to the surface 840. Since there may be a one-to-one correspondence between a projected gaze target and the projection element 812 producing that projected gaze target, in some embodiments, 3D coordinates (in the cabin coordinate system) of a projected gaze target may be associated with its corresponding projection element 812 in a memory of the ground truth training data collection system 110 for reference. When that projection element 812 of the gaze target projector 800 is selected for illumination, the target coordinate mapping function 118 may determine a position in the 3D space (e.g., 3D coordinates) for the projected gaze target by recalling the set of 3D coordinates from memory associated with the projection element 812.

The method 900, at block B906, includes generating one or more ground truth data images comprising an image of an occupant of the interior space and a label based on the position in the 3D space. For example, sensor data 102 capturing the test occupant's eyes and gaze direction while the projected gaze target is illuminated may be labeled (e.g., tagged) by the ground truth image data labeling function 120 with the 3D coordinates of the projected gaze target (in the cabin coordinate system) to produce ground truth data 122. Additional ground truth gaze data 122 may be generated in the same manner to produce the gaze training dataset 140 by sequentially generating additional projected gaze targets 620 onto various different interior surfaces of the cabin while the OMS sensor 101 captures the driver's (or other occupant's) eyes and gaze direction. In some embodiments, an image of ground truth gaze data 122 may be further labeled to indicate the type of gaze target projector 130 (e.g., a gaze target projector 200 verses a heads-up gaze target projector) was used to generate that image sample of ground truth gaze data 122).

As previously discussed, LED panels are an example of one type of existing ground truth data collection technology that may be used to collect training image data to train a DNN for an OMS, though using LED panels to provide gaze targets for producing ground truth training data where the tool needs to be placed on surfaces that are curved, small, or irregular shape in shape. That said, in some embodiments, one or more LED panels may be used together with the ground truth training data collection system 110. For example, turning to FIG. 10, FIG. 10 is an illustration of an example ground truth data collection tool 1000 that comprises a gaze target illuminating panel (such as an LED panel) that may be used with the ground truth training data collection system 110 (e.g., in combination with a gaze target projector 130) to produce gaze training dataset 140.

Figure 10:
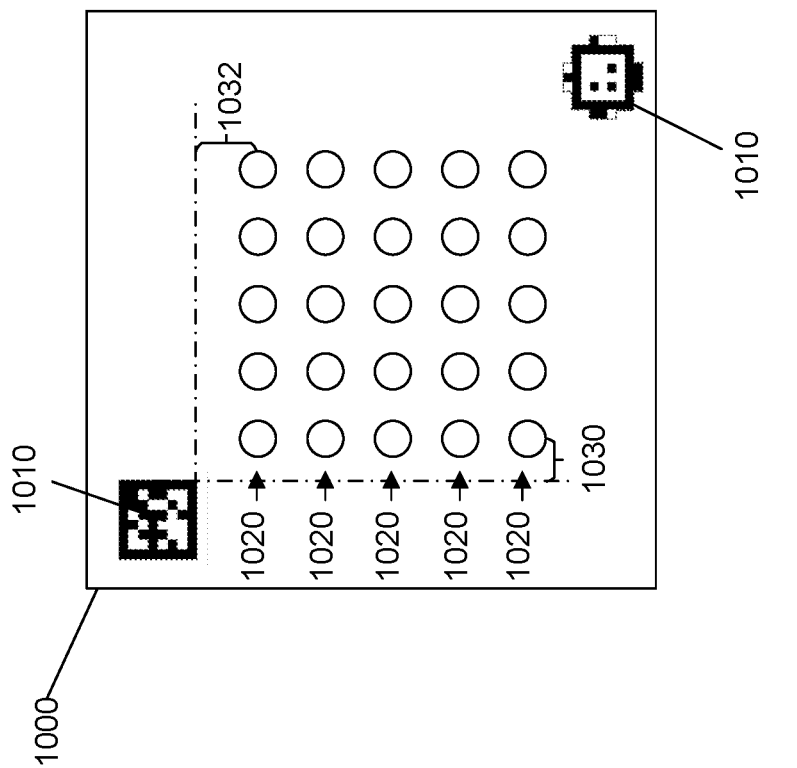
FIG. 10 is an example illustration of a ground truth data collection tool, in accordance with some embodiments of the present disclosure.

In the embodiment shown in FIG. 10, the ground truth data collection tool 1000 may comprise and one or more driver gaze targets 1020. In some embodiments, the gaze targets 1020 comprise illuminating devices, such as light emitting diodes (LEDs) for example, that may be selectively illuminated (e.g., as selected by the gaze target selection controller 112) to capture the attention of a test occupant and cause the test driver to gaze at the illuminated gaze target 1020. In some implementations, a plurality of such ground truth data collection tools 1000 may be positioned within the internal space of the cabin at various designated gaze region locations.

In some embodiments, the ground truth data collection tool 1000 may comprise one or more fiducial point markers 1010 and 3D coordinates (in the cabin coordinate system) for each of the gaze targets 1020 may be determined based on known offsets of a gaze target 1020 from a fiducial point marker 1010. For example, the ground truth data collection tool 1000 may be placed at a designated gaze region having known 3D coordinates in the cabin coordinate system (e.g., based on vehicle geometry 512) so that the 3D coordinates of the fiducial point markers 1010 are also known. Using images of the fiducial point markers 1010, a pose computation algorithm such as discussed above (e.g., the OpenCV algorithm solvePnP) may be used to compute a rotation-translation matrix that defines a rotation-translation transform describing the pose of the ground truth data collection tool 1000 with respect to the cabin coordinate system. A horizontal offset 1030 and vertical offset 1032 between the fiducial point markers 1010 and the one or more gaze targets 1020 are known constants from the construction of the ground truth data collection tool 1000 so that the 3D coordinates with respect to the cabin coordinate system for each of the driver gaze targets 1020 are therefore readily computed, for example as a function of their offset from one of fiducial point markers 1010 and the established pose of the ground truth data collection tool 1000. In some embodiments sensor data 102 may be captured by the ground truth training data collection system 110 as the ground truth data collection tool 1000 is controlled to selectively illuminate gaze targets 1020, and the test occupant's gaze is directed at the projected gaze targets. The sensor data 102 may be labeled (e.g., tagged) with the 3D coordinates of the illuminate gaze targets 1020 to produce ground truth data 122 corresponding to a training image. Additional ground truth gaze data 122 may be generated in the same manner to produce a gaze training dataset 140 by controlling the ground truth data collection tool 1000 to illuminate other gaze targets 1020 while sensor data 102 capture the driver's (or other occupant's) eyes and gaze direction.

In some embodiments, a ground truth data collection tool 1000 may be used together with a gaze target projector 130 (e.g., such as the gaze target projector 200 as shown in FIG. 2 and/or he gaze target projector 800 as shown in FIG. 8) to implement the ground truth training data collection system 110 of FIG. 1. In such embodiments, the gaze training dataset 140 may include images of ground truth gaze data 122 collected using, a gaze target projector 200 (e.g., a robotic gaze target projector), a gaze target projector 800 (e.g., a head-up gaze target projector) and or a ground truth data collection tool 1000 (e.g., an LED panel). In some embodiments, an image of ground truth gaze data 122 may be further labeled to indicate the type of gaze target projector 130 (e.g., a gaze target projector 200 verses a heads-up gaze target projector) and/or ground truth data collection tool 1000 that was used to generate that image sample of ground truth gaze data 122).

Figure 11:
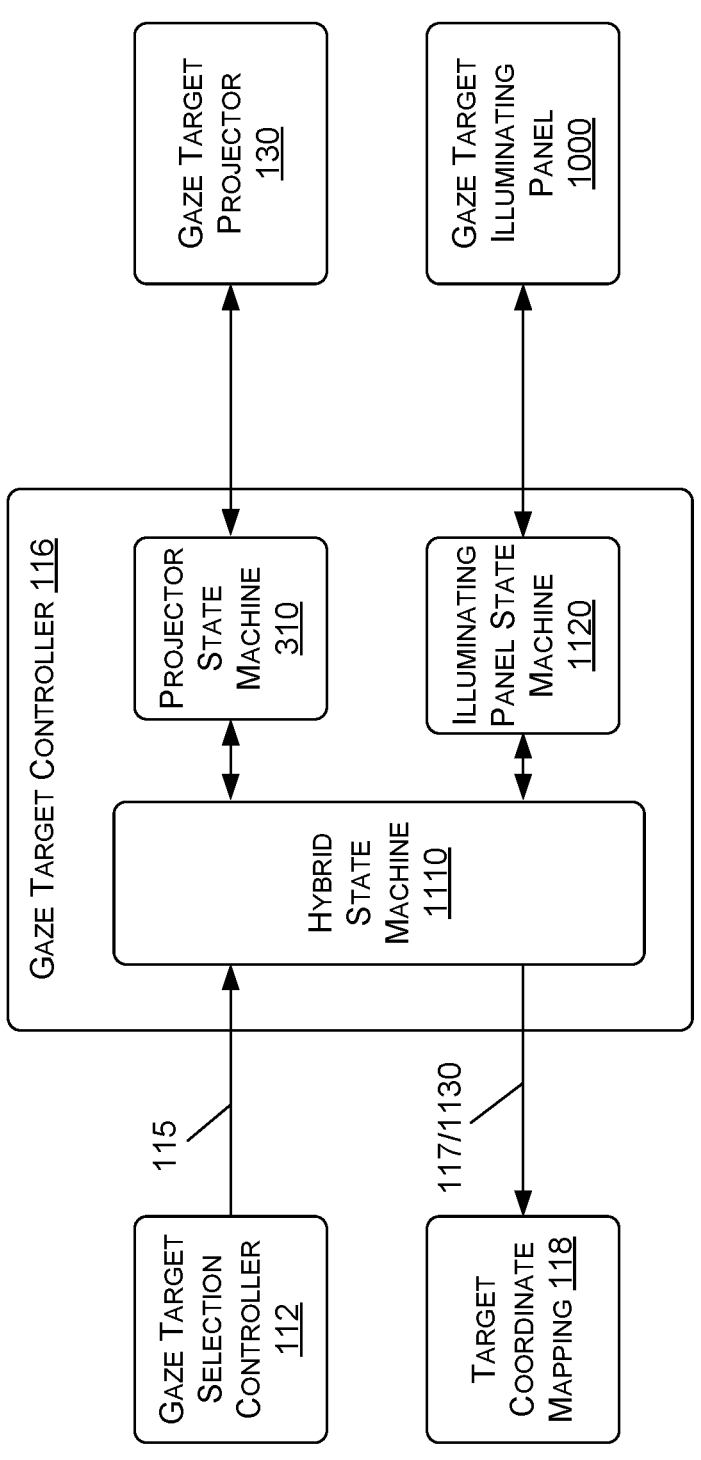
FIG. 11 is an illustration of an example gaze target controller, in accordance with some embodiments of the present disclosure.

FIG. 11 illustrates a hybrid implementation of a gaze target controller 116 (e.g., such as shown in FIGS. 1 and 3) where the ground truth gaze data is collected using a gaze target projector in combination with a ground truth data collection tool 1000. As shown in FIG. 11, this implementation of the gaze target controller 116 may include an illuminating panel state machine 1120 that controls illumination of gaze targets 1020 of round truth data collection tool 1000 (e.g., based on control signals 115 from the gaze target selection controller 112). In some embodiments, the gaze target controller 116 may include a hybrid state machine 1110 that communicates with the gaze target selection controller 112. Based on the control signals 115 from the gaze target selection controller 112, the hybrid state machine 1110 may determine whether a gaze target location of a desired gaze target is located on a ground truth data collection tool 1000 installed within the cabin, or otherwise is to be generated as a projected gaze target by the gaze target projector. When the hybrid state machine 1110 determine that the gaze target location corresponds to a ground truth data collection tool 1000, the hybrid state machine 1110 may control the illuminating panel state machine 1120 to illuminate the corresponding gaze targets 1020 as discussed above, and may output 3D coordinates 1130 for the illuminated gaze targets 1020 to the target coordinate mapping function 118, which in turn outputs 3D coordinates 119 in the cabin coordinate system to the ground truth image data labeling function 120. When the hybrid state machine 1110 determine that the gaze target location does not corresponds to a ground truth data collection tool 1000, the hybrid state machine 1110 may control the projector state machine 310 to illuminate a corresponding projected gaze target 620 as discussed above, and may output 3D coordinates 117 for the projected gaze target 620 to the target coordinate mapping function 118, which in turn outputs 3D coordinates 119 in the cabin coordinate system to the ground truth image data labeling function 120.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 12A:
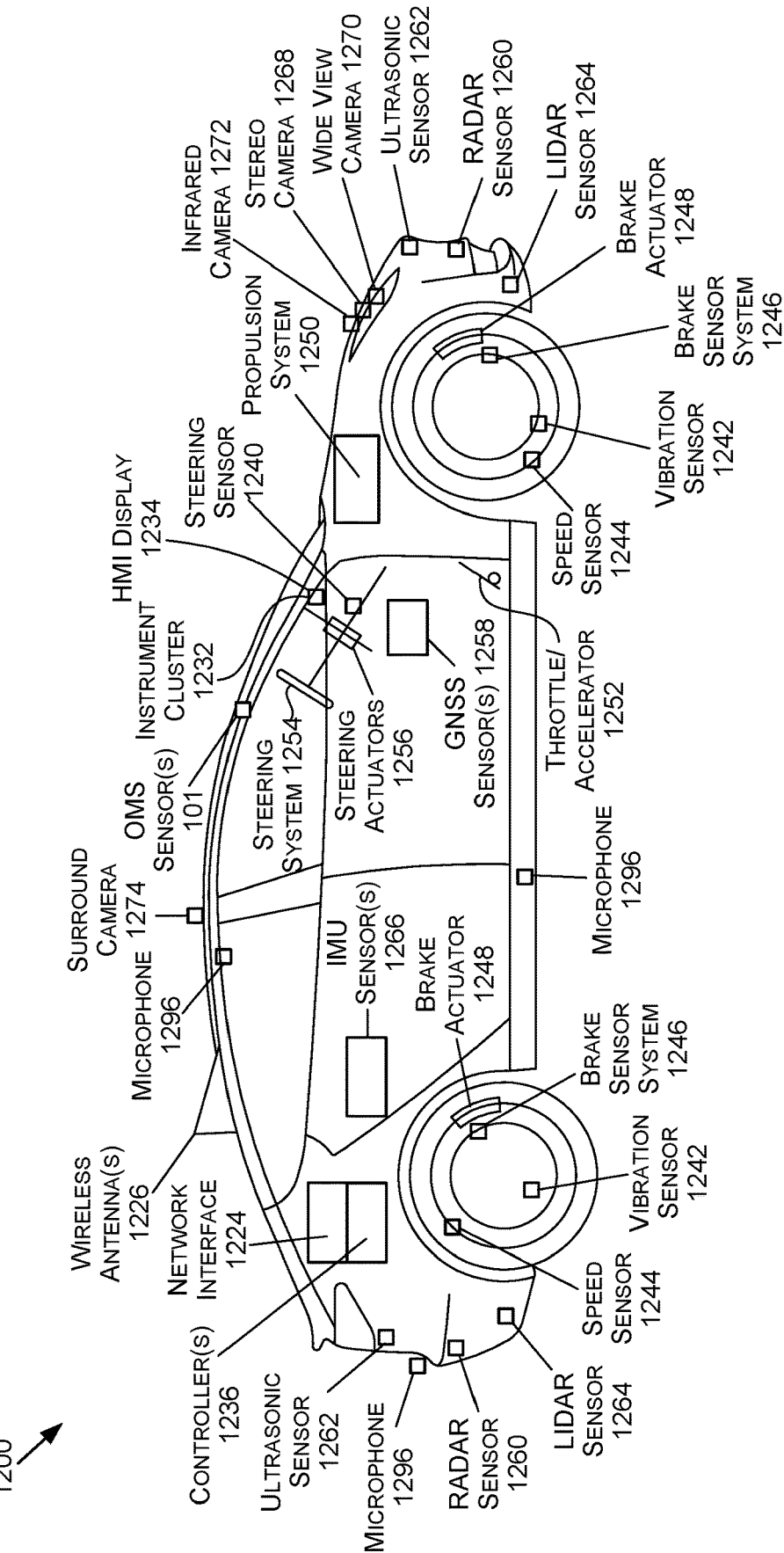
FIG. 12A is an illustration of an example autonomous vehicle, in accordance with some embodiments of the present disclosure.

FIG. 12A is an illustration of an example autonomous vehicle 1200, in accordance with some embodiments of the present disclosure. The autonomous vehicle 1200 (alternatively referred to herein as the "vehicle 1200") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1200 may be capable of functionality in accordance with one or more of Level 3-Level 5 of the autonomous driving levels. The vehicle 1200 may be capable of functionality in accordance with one or more of Level 1-Level 5 of the autonomous driving levels. For example, the vehicle 1200 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1200 or other machine, such as being fully autonomous, being highly autonomous, being conditionally autonomous, being partially autonomous, providing assistive autonomy, being semi-autonomous, being primarily autonomous, or other designation.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems ("GNSS") sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the High Definition ("HD") map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). In some embodiments, one or more components of the ground truth training data collection system 110 may be implemented at least in part by one or more of the controller(s) 1236. In some embodiments, the human machine interface 105 may be implemented using HMI display 1234.

The vehicle 1200 further includes a network interface 1224 which may use one or more wireless antenna(s) 1226 and/or modem(s) to communicate over one or more networks. For example, the network interface 1224 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1226 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 12B:
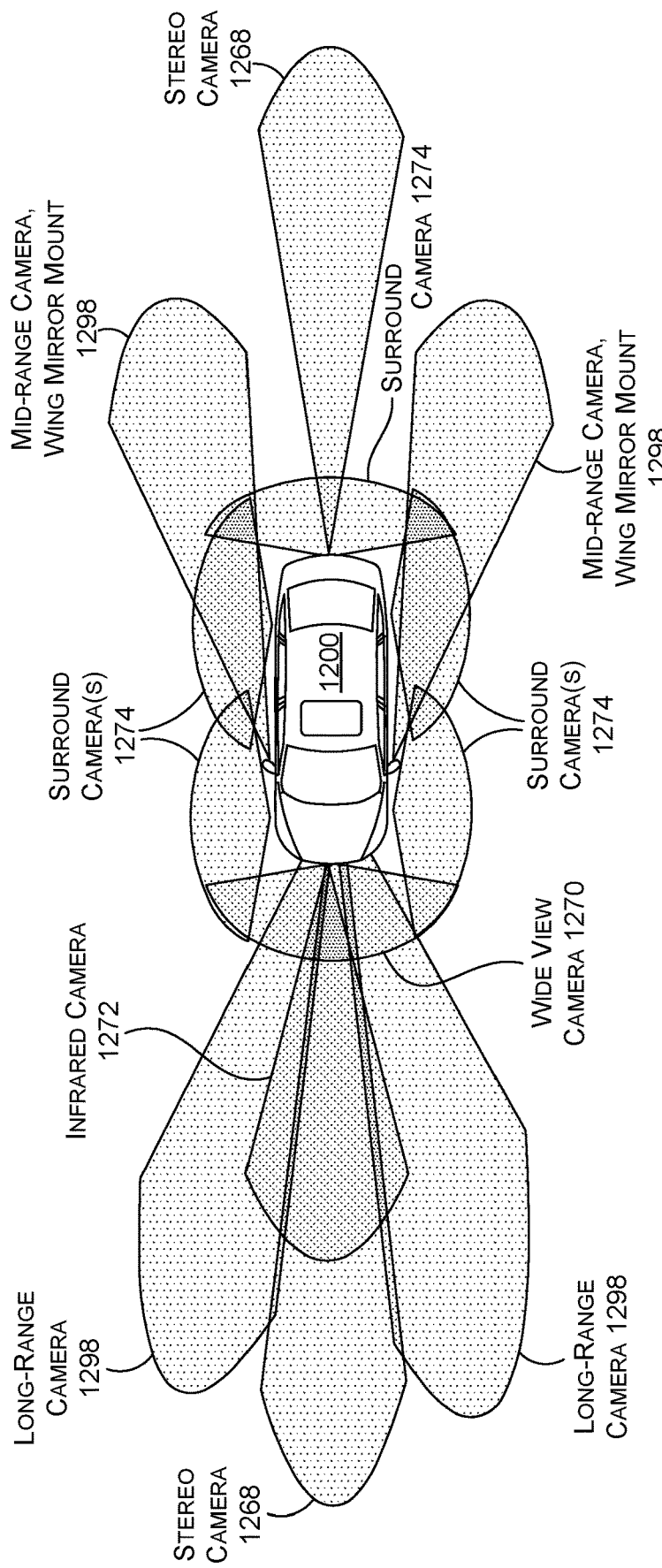
FIG. 12B is an example of camera locations and fields of view for the example autonomous vehicle of FIG. 12A, in accordance with some embodiments of the present disclosure.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200. For example, one or more cameras and/or other sensors to implement OMS sensor 101 may be positioned to observe the position and/or movements of occupants within the cabin of vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semi-conductor ("CMOS") color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may be any number (including zero) of wide-view cameras 1270 on the vehicle 1200. In addition, any number of long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

Any number of stereo cameras 1268 may also be included in a front-facing configuration. In at least one embodiment, one or more of stereo camera(s) 1268 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1268 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360 degree camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

Cameras with a field of view that include portions of the interior environment within the cabin of the vehicle 1200 (e.g., such as one or more OMS sensors 101) may be used for an occupant monitoring system (OMS) such as, but not limited to, a driver monitoring system (DMS). For example, OMS sensors (e.g., such as one or more OMS sensor 101) may be used (e.g., by controller(s) 1236) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze controlled operations by driver and/or non-driver occupants such as, but not limited to, adjusting cabin temperature and/or airflow, opening and closing windows, controlling cabin lighting, controlling entertainment systems, adjusting mirrors and/or adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 12C:
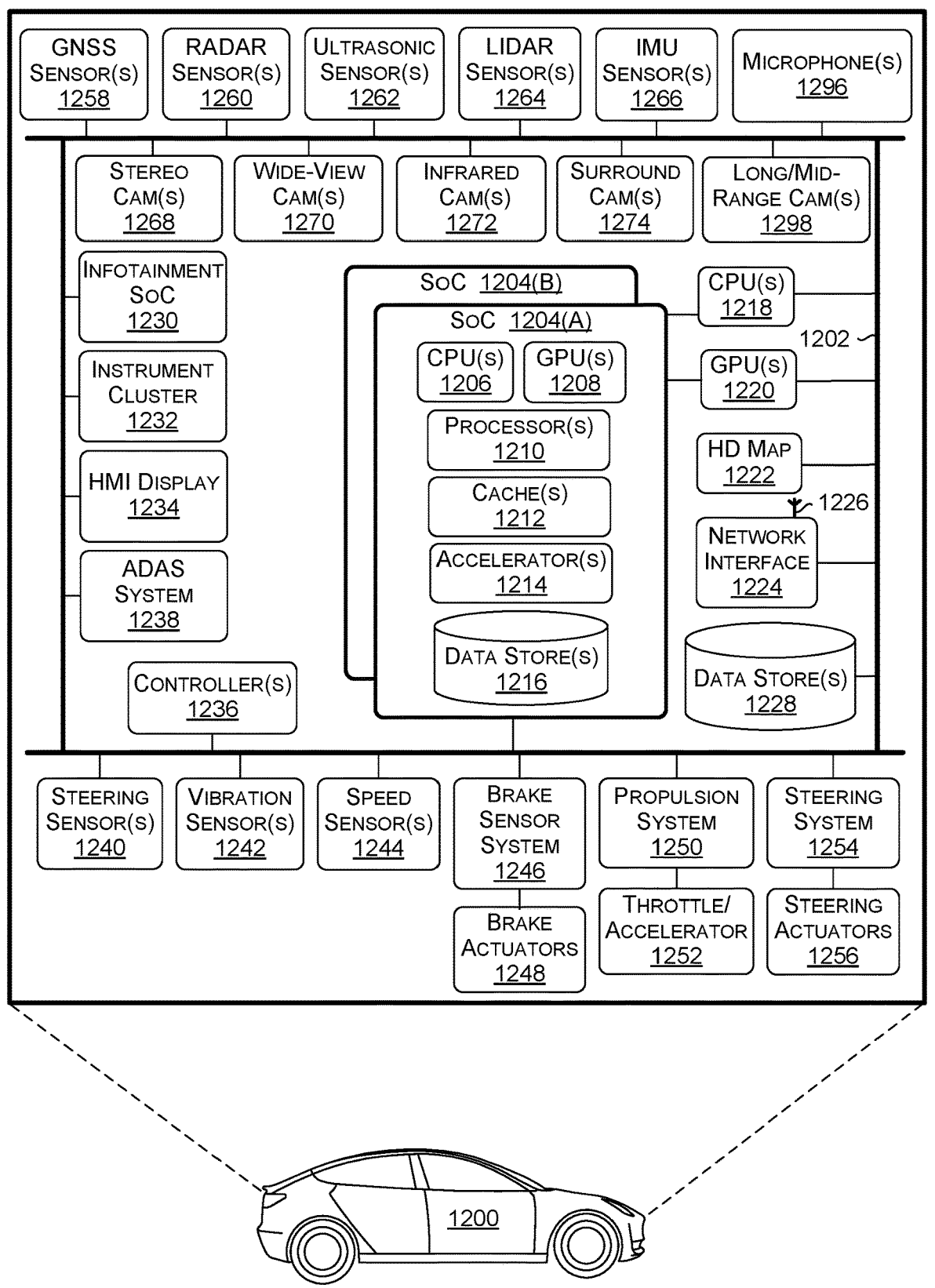
FIG. 12C is a block diagram of an example system architecture for the example autonomous vehicle of FIG. 12A, in accordance with some embodiments of the present disclosure.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include an arithmetic logic unit(s) (ALU(s)) which may be leveraged in performing processing with respect to any of the variety of tasks or operations of the vehicle 1200—such as processing DNNs. In addition, the SoC(s) 1204 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1206 and/or GPU(s) 1208.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link.

The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include a SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS, assisted GPS sensors, differential GPS (DGPS) sensors, etc.), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 120-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1200), while the I2V communication concept provides information about traffic further ahead. CACC systems may include either or both I2V and V2V information sources. Given the information of the vehicles ahead of the vehicle 1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and Bluetooth connectivity, carputers, in-car entertainment, Wi-Fi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

Figure 12D:
FIG. 12D is a system diagram for communication between cloud-based server(s) and the example autonomous vehicle of FIG. 12A, in accordance with some embodiments of the present disclosure.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284(H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based on training performed at a datacenter (e.g., using the server(s) 1278 and/or other servers).

The server(s) 1278 may be used to train machine learning models (e.g., neural networks) based on training data (such as but not limited to gaze training dataset 140). The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning).

Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 13:
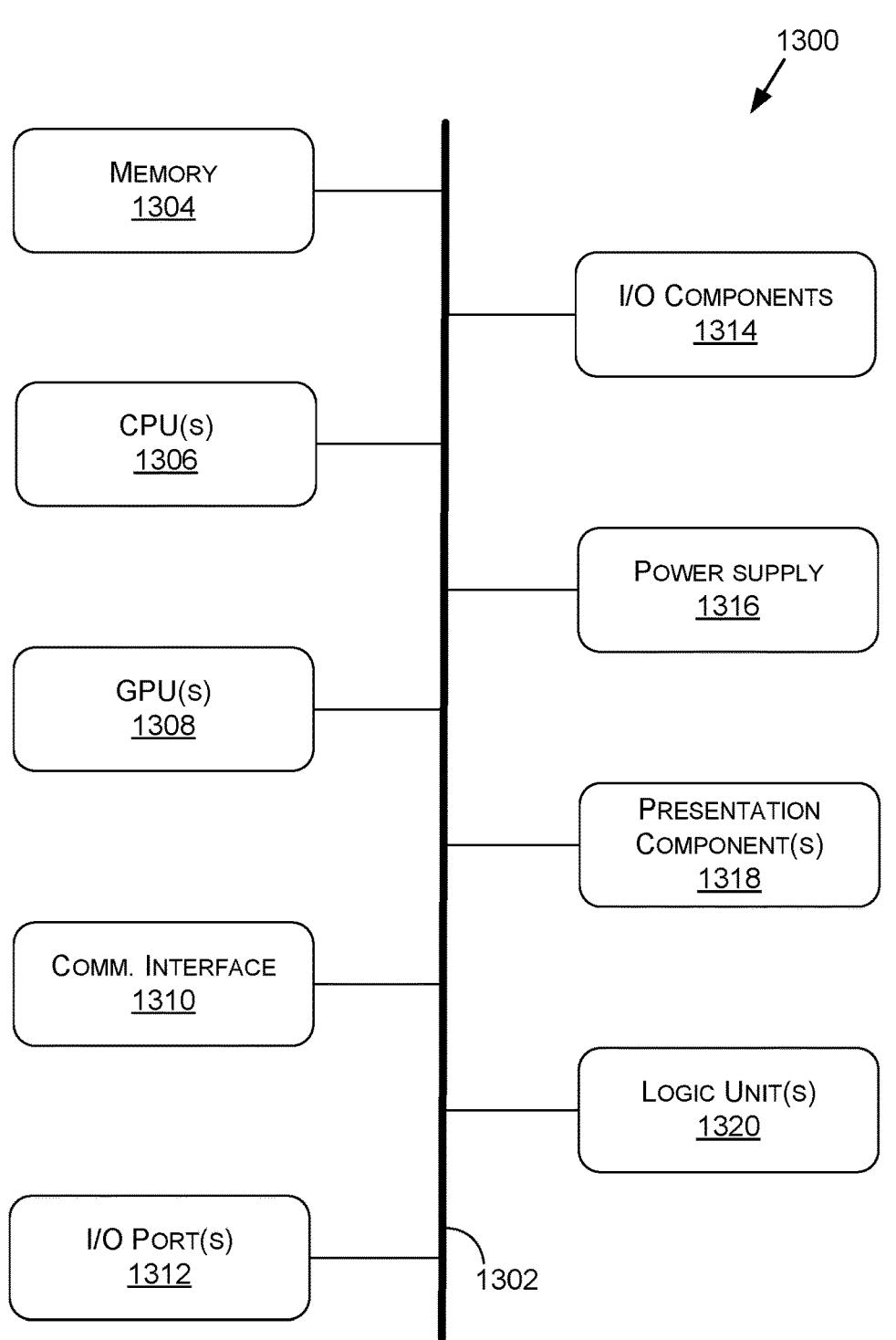
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure, such as but not limited to one or more components of the ground truth training data collection system 110. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. For example, the CPU(s) 1306 may execute code to implement one or more components of the ground truth training data collection system 110 describe herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. For example, the GPU(s) 1308 may execute code to implement one or more components of the ground truth training data collection system 110 describe herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.). For example, in some embodiments, a gaze target projector may be implemented using one or more of presentation component(s) 1318.

Example Data Center

Figure 14:
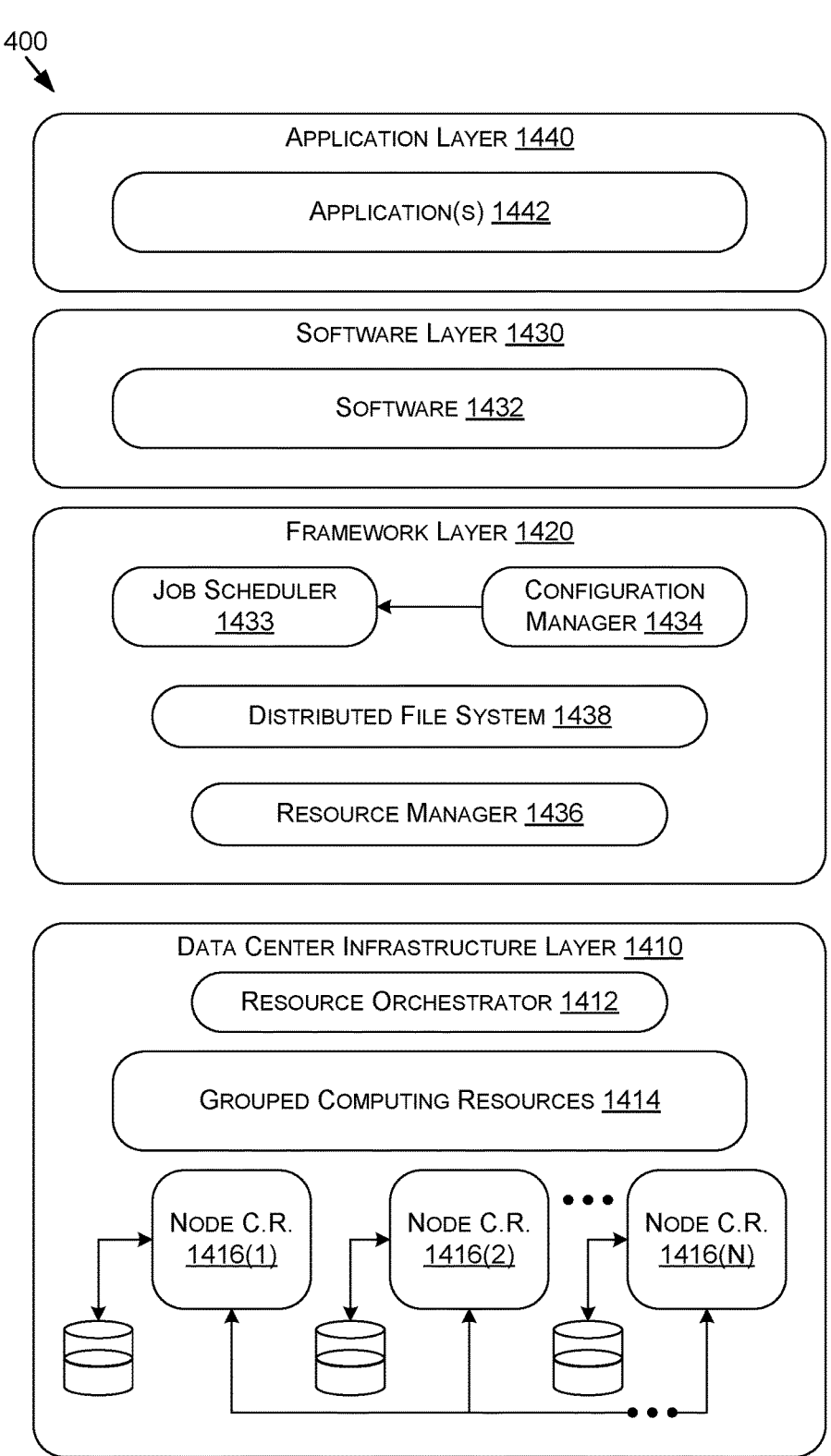
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161 (N) may include one or more virtual components, such as vGPUs, vCPUs, and/or the like, and/or one or more of the node C.R.s 1416(1)-1416(N) may correspond to a virtual machine (VM). In some embodiments, one or more components of the ground truth training data collection system may be implemented by one or more of the node C.R.s 1416(1)-1416(N).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1433, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1433 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1433. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underutilized and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to:

control a gaze target projector to cause a projection of a gaze target to appear on a surface of an interior space at one or more selected projection point locations of a plurality of selectable projection point locations on the surface;

determine a position in a three-dimensional (3D) space corresponding to the one or more selected projection point locations of the projection of the gaze target; and generate one or more data images comprising an image of an occupant of the interior space during the projection of the gaze target and a label indicating the position in the 3D space.

2. The system of claim 1, wherein the one or more processing units are further to:

label the image of the occupant of the interior space based on the position in the 3D space, wherein the image captures a gaze of the occupant responsive to the projection of the gaze target.

3. The system of claim 1, wherein the one or more processing units are further to:

control at least one rotational orientation of the gaze target projector to cause the projection of the gaze target to appear at a gaze target location on the surface of the interior space.

4. The system of claim 1, wherein the one or more processing units are further to:

control a position of a repositionable platform to cause the projection of the gaze target to appear at a gaze target location on the surface of the interior space, wherein the gaze target projector is mounted to the repositionable platform.

5. The system of claim 1, wherein the gaze target projector comprises a range finding sensor, wherein the one or more processing units are further to compute the 3D coordinate based on a distance measured by the range finding sensor.

6. The system of claim 1, wherein the gaze target projector comprises:

at least a first motor to control a position of a visual projection emitter with respect to an azimuth axis; and at least a second motor to control the position of the visual projection emitter with respect to an elevation axis;

wherein the visual projection emitter generates the projection of the gaze target.

7. The system of claim 1, wherein the one or more processing units are further to:

control an activation of a visual projection emitter to cause the projection of the gaze target to appear on the surface of the interior space.

8. The system of claim 1, wherein the one or more processing units are further to:

control an activation of one or more projection elements of a display projector to cause the projection of the gaze target to appear on the surface of the interior space.

9. The system of claim 1, wherein the one or more processing units are further to:

control an LED panel to produce an illuminated gaze target;

determine a second position in the 3D space corresponding to a location of the illuminated gaze target; and generate one or more further data images comprising a second image of the occupant of the interior space and a second label based on the second position in the 3D space.

10. The system of claim 1, wherein the gaze target projector comprises one or more fiducial point markers, wherein the one or more processing units are further to determine the position in the 3D space corresponding to the location of the projection of the gaze target based at least on a coordinate of the one or more fiducial point markers.

11. The system of claim 1, wherein the surface of the interior space comprises an anti-reflective surface treatment.

12. The system of claim 1, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for generating or presenting at least one of virtual reality content, augmented reality content, or mixed reality content;

a system for performing deep learning operations;

a system for performing real-time streaming;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

13. A processor comprising:

one or more processing units to:

cause a projected gaze target to appear on a surface of an interior space at one or more selected projection point locations of a plurality of selectable projection point locations;

capture an image of the interior space while the gaze target is projected onto the surface, wherein the image captures a gaze of an occupant responsive to projection of the projected gaze target;

determine a position in a three-dimensional (3D) space corresponding to a location of the one or more selected projection point locations projected gaze target; and apply a label to the image of the occupant of the interior space, the label indicating the position in the 3D space.

14. The processor of claim 13, wherein the one or more processing units are further to:

control at least one rotational orientation of a gaze target projector to cause the projected gaze target to appear at a gaze target location on the surface of the interior space.

15. The processor of claim 13, wherein the one or more processing units are further to:

compute the position in the 3D space based on a distance measured by a range finder.

16. The processor of claim 13, wherein the one or more processing units are further to:

control an activation of a visual projection emitter to produce the projected gaze target on the surface of the interior space.

17. The processor of claim 13, wherein the one or more processing units are further to:

control an activation of one or more projection elements of a heads-up display projector to produce the projected gaze target on the surface of the interior space.

18. The processor of claim 13, wherein the one or more processing units are further to:

adjust one or more parameters based on the image.

19. The processor of claim 13, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating or presenting at least one of virtual reality content, augmented reality content, or mixed reality content;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

20. A method comprising:

generating training data by controlling an activation of a visual projection emitter to project a gaze target onto one or more selected projection point locations of a plurality of selectable projection point locations on a surface of an interior space, the training data comprising: an image of a gaze of an occupant of the interior space captured while the gaze target is projected, and a label indicating a three dimensional coordinate of the gaze target in a coordinate system of the interior space.

*　*　*　*　*